(12) United States Patent
Nishikaji

(10) Patent No.: US 6,375,214 B1
(45) Date of Patent: Apr. 23, 2002

(54) OCCUPANT PROTECTION DEVICE OF VEHICLE

(75) Inventor: Satoshi Nishikaji, Hiroshima-ken (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 09/605,546

(22) Filed: Jun. 29, 2000

(30) Foreign Application Priority Data

Jul. 12, 1999 (JP) .......................................... 11-197280
Jul. 30, 1999 (JP) .......................................... 11-217227

(51) Int. Cl.$^7$ .............................................. B60R 21/16
(52) U.S. Cl. ................................ 280/728.2; 280/730.2
(58) Field of Search ........................ 280/728.2, 728.1, 280/730.1, 730.2, 743.2, 749

(56) References Cited

U.S. PATENT DOCUMENTS

| | | | | |
|---|---|---|---|---|
| 6,095,551 A | * | 8/2000 | O'Docherty | 280/730.2 |
| 6,155,597 A | * | 12/2000 | Bowers et al. | 280/730.2 |
| 6,168,193 B1 | * | 1/2001 | Shirk et al. | 280/730.2 |
| 6,176,513 B1 | * | 1/2001 | Neidert | 280/729 |
| 6,176,515 B1 | * | 1/2001 | Wallner et al. | 280/730.2 |
| 6,217,060 B1 | * | 4/2001 | Mangold et al. | 280/730.2 |
| 6,224,091 B1 | * | 5/2001 | Eyrainer et al. | 280/703.2 |

FOREIGN PATENT DOCUMENTS

| | | |
|---|---|---|
| DE | 297 18 305 U1 | 3/1998 |
| DE | 197 04 051 A1 | 8/1998 |
| DE | 298 03 985 U1 | 8/1998 |
| DE | 298 06 200 U1 | 10/1998 |
| DE | 198 43 493 C1 | 3/2000 |
| DE | 200 01 960 U1 | 7/2000 |
| EP | 0 814 001 A1 | 12/1997 |
| EP | 0 955 213 A1 | 11/1999 |
| GB | 2 324 068 A | 10/1998 |
| JP | 10-138857 | 5/1998 |

OTHER PUBLICATIONS

European Search Report—M 4495EU—hl—00114040.9–2306 dated: Oct. 27, 2000.

\* cited by examiner

*Primary Examiner*—Paul N. Dickson
*Assistant Examiner*—Faye M. Fleming
(74) *Attorney, Agent, or Firm*—Nixon Peabody LLP; Donald R. Studebaker

(57) ABSTRACT

A curtain type airbag device A in which an airbag is disposed on each of left and right sides of the vehicle and is extended from a roof side rail 5 downward so as to cover an inside of each of side windows when an impact load is acted on a side of the vehicle, whereby an improvement of a vehicle occupant protection device performance and a manufacturing cost reduction are achieved by reducing an amount of seams on the airbag while securing a restraint performance for the occupant by providing a tension to the expanded airbag in the longitudinal direction. A front tether and a rear tether are provided for connecting a front lower end and a rear lower end of the airbag to a front pillar and a quarter pillar respectively. A through-hole is formed in a rear side of an expanding portion disposed on a front end of the airbag, and an end of the front tether is wound around the expanding portion from a front right side of the expanding portion, and is passed through the hole to be returned back frontward at an opposite left side of the expanding portion, and is sewn to the seams of the airbag together with being wound around on the left side of the expanding portion.

16 Claims, 18 Drawing Sheets

OCCUPANT PROTECTION DEVICE OF VEHICLE

FIELD OF THE INVENTION

The present invention relates to an occupant protection device, such as an airbag, for protecting an occupant when an impact load is acted on a vehicle, and, in particular, to one type of airbag which is expanded along a side window to protect an occupant's head and to prevent the occupant from being thrown out of a compartment of the vehicle.

BACKGROUND OF THE INVENTION

Heretofore, as to such a occupant protection device of a vehicle, there has been known a device, for example, disclosed in Japanese Patent Laid-open Publication No. Hei 10-166988, in which a longitudinally extendable airbag is folded and the folded airbag is housed along a front pillar and a roof side frame to be expanded downward along a side window in the form of a curtain when an impact load is acted on a side of a vehicle.

In the device described above, a front end of the airbag is connected to a lower side of the front pillar of the vehicle, while its rear end is connected to an upper side of a quarter pillar. The airbag is also divided over the front end to the rear end into a plurality of small bags (expanding portions) which may extend approximately vertically with having respective cylinder shapes, i.e. a curtain-like shape as a whole, in the expanded condition of the air bag. Expanding these plurality of small bags respectively makes the airbag shorten in the longitudinal length as a whole. This results in a tension in the longitudinal direction to enable the airbag to restrain a head or the like of an occupant.

Further, among the plurality of small airbags in this conventional airbag described above, the small bags disposed rearward with respect to a center pillar of the vehicle are adapted to have particularly large size in diameter than others. This may improve the restraint performance to an occupant because, for example, when an occupant's head which is moving toward outside of the compartment is restrained by the airbag, the small bags having larger diameter may be caught by the center pillar to control a displacement of the airbag.

However, since the conventional airbag is made by sewing to divide it into the plurality of small bags, there is a problem that a shock absorbing performance cannot sufficiently be obtained in the vicinity of seams of the airbag and an overall occupant protection performance is also lowered. In addition, since a strength of the airbag is lowered in proportion to increased seams, there is the possibility that the seams is torn during its expansion, resulting in deterioration of the occupant protection performance.

Further, in addition to a sewing operation for making such an airbag, it is also necessary to apply an sealant to the seams for preventing a expansion gas from leaking through the seams. This additional measure requires significant labors and times, and results in remarkably increased manufacturing cost.

SUMMARY OF THE INVENTION

In view of the problems described above, the present invention was made. An object of the present invention is to enhance the occupant protection performance and the cost reduction through means of reducing seams of an airbag with maintaining the occupant restraint performance by exercising ingenuity in a structure for giving a tension in the longitudinal direction to the airbag during its expansion, in a curtain type airbag expanding to cover an inside of a side window when an impact is acted on a vehicle.

Another object of the present invention is to improve the curtain airbag type of occupant protection device described above by means of introducing a new layout in a expansion of the airbag so that the impact load at the time when the occupant secondarily collides with the rear pillar disposed on the rear side of the window can be absorbed to surely protect the occupant.

To achieve the aforementioned object, the present invention provides connecting members for connecting front and rear ends which are located at a lower portion of an airbag to a body of a vehicle body respectively, and a slack absorbing device applied to at least one of the connecting members for absorbing a slack of the connecting members in the expanded condition of the airbag.

In particular, according to one aspect of the present invention, there is provided an occupant restraint equipment of a vehicle on the presumption that the vehicle includes a front side pillar and a rear side pillar disposed on front and rear sides of a side window of the vehicle respectively, and a roof side rail longitudinally extended to connect respective upper ends of the both pillars each other, and the occupant protection device includes an airbag which is folded and housed in the range from the front side pillar to the rear side pillar through the roof side rail so that the airbag is expanded to cover an inside of the side window when an impact load is acted on a side of the vehicle. Thereat, the occupant restraint equipment of the present invention comprises an upper edge of the airbag fixed to at least the roof side rail, a front connecting member for connecting a front lower end of the airbag to a body of the vehicle positioned frontward more than the side window, a rear connecting member for connecting a rear lower end of the airbag to a body of the vehicle positioned rearward more than the side window; and a slack absorbing device attached to at least one of the front and rear connecting members for absorbing a slack in the connecting members in the expanded condition of the airbag.

According to the aforementioned structure, the airbag primarily housed in the roof side rail of the vehicle is extended downward to cover the inside of the side window when an impact load is acted on the side of the vehicle. On this way, the folded airbag is extended downward as a whole, and a slack of the connecting members fixed to the lower side of the airbag is absorbed by the slack absorbing device, so that the front and rear connecting members may provide a sufficient tension to the air bag by longitudinal pulling of the connecting members. Thus, it is no longer required to divide the air bag into a plurality of small bags as the conventional airbag. This enables to decrease the seams of the airbag to which an occupant would be contacted in the expanded condition of the airbag, and so the occupant protection performance can be improved. In addition, the manufacturing cost can be reduced due to the reduced seams.

According to a preferred embodiment of the invention, the slack absorbing device may include an expanding portion which is formed in at least one of the front and rear ends of the airbag and is expanded in the expanded condition of the airbag, and at least one of the connecting members includes an end which is fixed to at least an area where the expanding portion is laterally expanded. In this embodiment, when the expanding portion disposed in the end of the airbag is expanded in the expanded condition of he airbag, the end fixed to the expanding portion is laterally displaced so that a longitudinal length of the connecting member may be shortened to absorb its slack.

According another preferred embodiment of the invention, the slack absorbing device may include an expanding portion which is formed in at least one of the front and rear ends of the airbag and is expanded in the expanded condition of the airbag, a hole which is formed in the airbag positoned in the central direction more than the expanding portion with laterally penetrating the airbag, and at least one of the connecting members includes an end which is passed through the hole from either of the left and right sides of the expanding portion to the opposite side of the expanding portion and is fixed at the opposite side of the expanding portion with being wound around the opposite side of the expanding portion.

In this embodiment, when the expanding portion disposed in the end of the airbag is expanded in the expanded condition on the airbag, the end portion of the connecting member is rolled up by the expanding portion. Therefore, if a slack of the connecting member is relatively large, the slack is desirably absorbed so that a sufficient tension may be provided to the airbag. Since the tension provided from the connecting member to the airbag is dispersed over a surrounding area of the expanding portion to avoid a load concentration, a possible breakage of the airbag can be prevented.

According to a further preferred embodiment of the present invention, the slack absorbing device may be disposed between at least one of the connecting members and a body of the vehicle. In this embodiment, it is unnecessary to process the airbag for providing the slack absorbing device. Thus, the increased seams and complicated structure of the airbag caused from this processing can be avoided. As a result, possible deterioration of the occupant protection performance and increased cost of the airbag can be prevented.

In this embodiment, at least one of the connecting members may include a first end connected to the airbag and a second end connected to the body, the first end being disposed upward more than the second end in the housed condition of the airbag, and the slack absorbing device may include a guide member for guiding the at least one of the connecting members with making the at least one of the connecting members bend when the first end is moved downward in the expanded condition of the airbag.

Without the slack absorbing device, since the first end of the connecting member is located upward more than the second end of the connecting member when the airbag is housed and is moved downward in the expanded condition of the airbag, a distance between both the ends of the connecting member in the expansion of the airbag becomes shorter than that in the housed condition of the airbag, and this causes a slack of the connecting members. In this embodiment of invention, since the connecting member is guided by the guide member to make the connecting member bend when the first end of the connecting member is moved downward in the expanded condition of the airbag, the slack of the connecting member can be absorbed.

In this preferred embodiment, the guide member may include a bank portion for pushing the at least one of the connecting members in the inward direction with respect to a compartment of the vehicle in the expanded condition of the airbag. This causes the connecting members to be pushed and bent by the bank portion in the middle of the expansion of the airbag. Thus a slack of the connecting members can be absorbed. In addition, since the airbag is wholly pushed in the inward direction with respect to a compartment through the connecting members, the occupant restraint performance can be enhanced.

According to another preferred embodiment of the present invention, wherein the connecting member may include an end connected to the airbag side, the end of the connecting member being sewn to the airbag at or in the vicinity of a seam of the airbag. In this embodiment, even when the end of the connecting member is sewn to the airbag in the vicinity of the seams, no deterioration of the shock absorbing performance of the airbag is caused because of a primitively low shock absorbing performance of the airbag near the seams. Further, when the connecting member is sewn to the airbag precisely at the seam, the strength reduction of the airbag caused from the sewing can be avoided.

According to a further preferred embodiment of the present invention, each of the front and rear connecting members may be housed between a pillar of the body and an interior member of the pillar in the housed condition of the airbag. This improves the commercial value since the connecting members are hidden behind the interior member.

According to a still further embodiment of the present invention, the vehicle may include: a plurality of seats disposed longitudinally, the plurality of seats having a front seat and a rear seat positioned rearward with respect to the front seat; a front pillar positioned at a forward position relative to the front seat; and a quarter pillar extending from the vicinity of the lateral side of the rear seat to the rear of the rear seat, wherein the front side pillar may be the front pillar, the rear side pillar may be the quarter pillar and wherein the airbag may be expanded to cover a side window disposed between the front pillar and the quarter pillar. In this embodiment, the airbag can be extremely widely extended in the longitudinal direction. Generally, when the length in the longitudinal direction is increased, the occupant restraint performance in the lateral direction naturally tends to be reduced. Therefore, absorbing the slack of the connecting member to provide a sufficient tension to the airbag can be quite effective to enhance the occupant restraint performance.

According to another aspect of the invention, there is provided, in addition to one expansion area to be expanded to cover the side window, another airbag expansion area which is located on a rear side of the expansion area and is expanded over the rear pillar positioned on a side of a compartment of the vehicle, so that the impact at the time when an occupant collides with the rear pillar can be absorbed.

Particularly, in an occupant protection device for a vehicle, wherein the vehicle includes: a front pillar and a rear pillar disposed on a front and rear sides of a side window of the vehicle respectively, the front and rear pillars being extended approximately vertically along the front and rear edges of the side window respectively; and a roof rail extended in the longitudinal direction of the vehicle to connect respective upper ends of the front and rear pillars, the occupant protection device comprises: an airbag including a first expansion area which is housed along at least the roof rail and is expanded into a compartment of the vehicle to cover the side window when an impact load is acted on a side of the vehicle; and a connecting member connected between a rear portion of the first expansion area of the airbag and a body of the vehicle positioned on a rear side of the first expansion area for providing a longitudinal tension to a lower portion of the airbag in the expansion of the airbag, wherein the airbag includes a second expansion area which is expanded rearward more than a fixing portion where the connecting member is fixed to the airbag.

According to the structure described above, in the case where and the airbag is expanded when an impact load is acted on the side of the vehicle, the first expansion area is expanded to cover the side window of the vehicle, and at the same time the longitudinal tension is provided to the lower portion of the airbag by the connecting member which is connected between the rear end of the first expansion area and the vehicle body. Thus, the impact at the time when an occupant secondarily collides with a window glass can be absorbed, or the occupant can be prevented from being thrown out of the window.

In addition, since the second expansion area of the airbag is expanded to be disposed rearward more than the fixing portion where the connecting member is fixed to the airbag, the impact at the time when an occupant secondarily collides with a body member of the vehicle in an area positioned rearward more than the fixing portion where the connecting member is fixed to the airbag, for example the rear pillar disposed on the rear side of the window, can be absorbed and mitigated by the second expansion area. Since the second expansion area is expanded rearward more than the fixing portion where the connecting member is fixed to the airbag and accordingly is a soft area where no tension is provided by the connecting member, the second expansion area provides an impact absorbing characteristic superior to that of the first expansion area where the tension by the connecting member is provided. Thus the impact on the occupant can be surely absorbed.

According to still another aspect of the present invention, in occupant protection device for a vehicle, wherein the vehicle includes: a front pillar and a rear pillar disposed on a front and rear sides of a side window of the vehicle respectively, the front and rear pillars being extended approximately vertically along the front and rear edges of the side window respectively; and a roof rail extended in the longitudinal direction of the vehicle to connect respective upper ends of the front and rear pillars, as same as the first invention, the occupant protection device comprises; an airbag including a first expansion area which is housed along at least the roof rail and is expanded into a compartment of the vehicle to cover the side window when an impact load is acted on a side of the vehicle; and a connecting member connected between a rear end of the airbag and a body of the vehicle positioned on a rear side of the airbag for providing a longitudinal tension to a lower portion of the airbag in the expansion of the airbag, wherein the airbag includes a second expansion area which is expanded into a compartment of the vehicle positioned rearward more than an exit portion through which the first expansion area is expanded into the compartment of the vehicle.

According to the structure described above, since the second expansion area is expanded into the compartment of the vehicle positioned rearward more than the exit through which the first expansion area is expanded into the compartment of the vehicle to cover the side window in the expansion of the airbag, the impact on the occupant at the time when the occupant secondarily collides with the rear pillar positioned on the rear side of the window can be absorbed and mitigated by the second expansion area.

In a preferred embodiment of the present invention, the second expansion area of the airbag is adapted to be expanded to cover at least a part of the rear pillar. This invention provides the same effect as the first invention.

In another preferred embodiment of the present invention, the rear pillar may be adapted to dispose on a side of an occupant seated on a rear seat of the vehicle; and the second expansion area of the airbag may be adapted to be expanded to overlap with the rear pillar when viewed from a side of the vehicle. Thus the reaction force at the time when an occupant collides with the rear pillar after the side impact is acted on the body ob the vehicle can be received by the rear pillar to surely absorb the impact.

In further embodiment of the present invention, a rear pillar trim may be provided to cover the rear pillar positioned on a side of a compartment of the vehicle, wherein a rear end portion of the first expansion area of the airbag, the second expansion area of the airbag and the connecting member are housed at least in the rear pillar trim and may be adapted to be expanded with running out from a front end of the rear pillar trim to an outside of the rear pillar trim in the expanded condition of the airbag. Thus, the airbag can be housed with excellent appearance of the vehicle interior since the airbag to be expanded at the front side and rear side of the front end of the rear trim can be hidden behind the trim when the airbag is in its housed condition.

In still another embodiment of the present invention, the second expansion area of the airbag may be adapted to be expanded earlier than the first expansion area. According to the above structure, the occupant can be surely protected further even when the rear pillar is protruded more toward the inside of the compartment of the vehicle comparing with the window and is located closer to the occupant, because the second expansion area positioned corresponding to the rear pillar is expanded earlier than the first expansion area positioned corresponding to the window.

DETAILED DESCRIPTION OF THE PREFERRED EMBODIMENTS

With reference to the drawings, preferred embodiments of the present invention will be described hereinafter.
Embodiment 1

Figure 1:
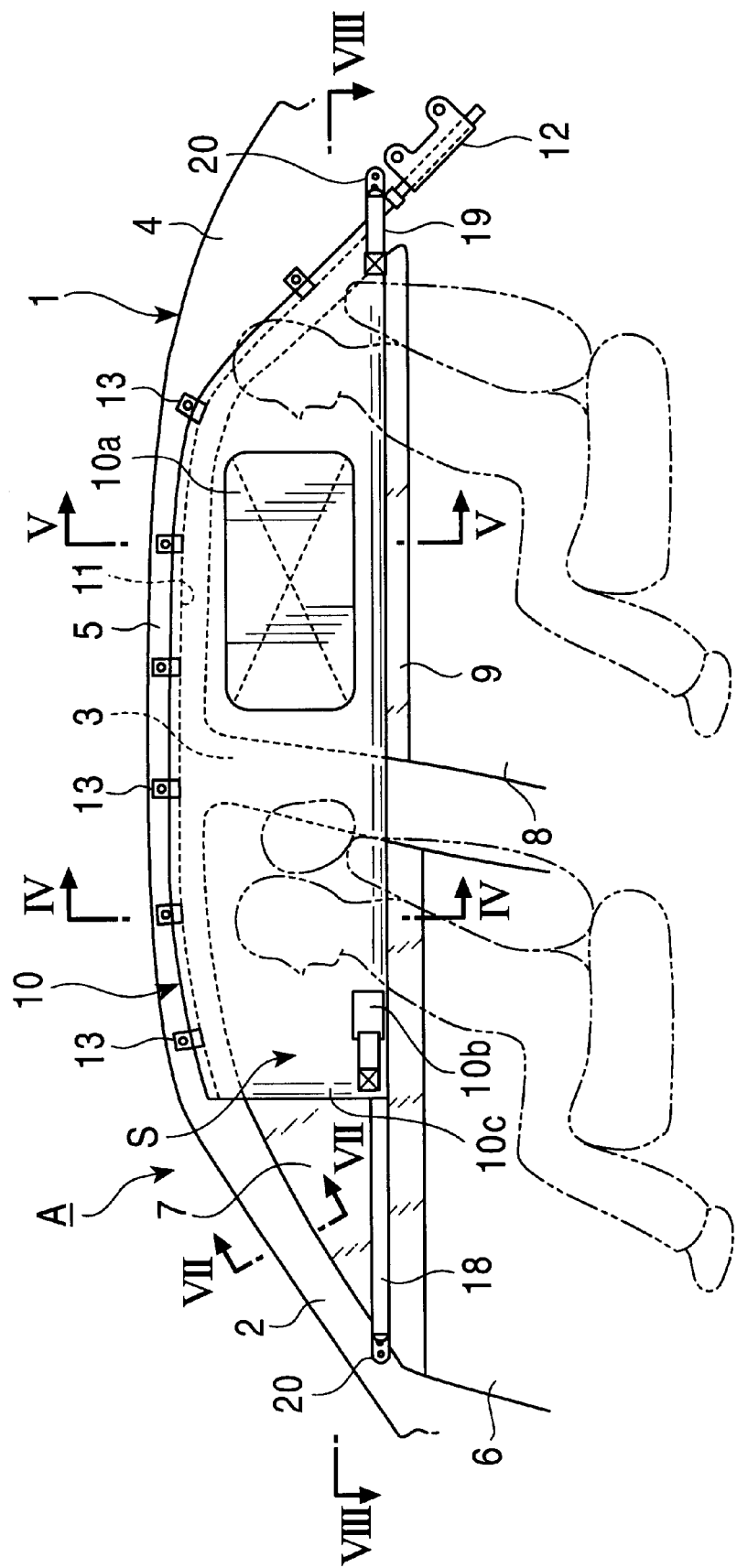
FIG. 1 shows an structure of a curtain type airbag device in the expanded condition of an airbag according to one embodiment of the present invention.

FIG. 1 shows a curtain type airbag device A (an occupant protection device of a vehicle) according to one embodiment of the present invention. The curtain type airbag device A is mounted on a right side body of three box type of a passenger vehicle 1. As shown, the airbag device is expanded to protect occupants when an impact which is higher than a predetermined value is acted on a right side of the vehicle 1 load. The curtain type airbag device A is also mounted on a left side body of the vehicle, but not shown.

In the right side body of the vehicle 1, a front pillar 2 connected to an engine-hood (not shown), a center pillar 3 and a quarter pillar 4 are disposed in the order from a front side of the body (i.e. the left side in the drawing). A roof side rail 5 longitudinally extends to connect the front pillar 2, the center pillar 3 and the quarter pillar 4 at their upper ends each other. A front door 6 and a front side window 7 are disposed between the front pillar 2 and the center pillar 3, while a rear door 8 and a rear side window 9 are disposed between the center pillar 3 and the quarter pillar 4.

Figure 2:
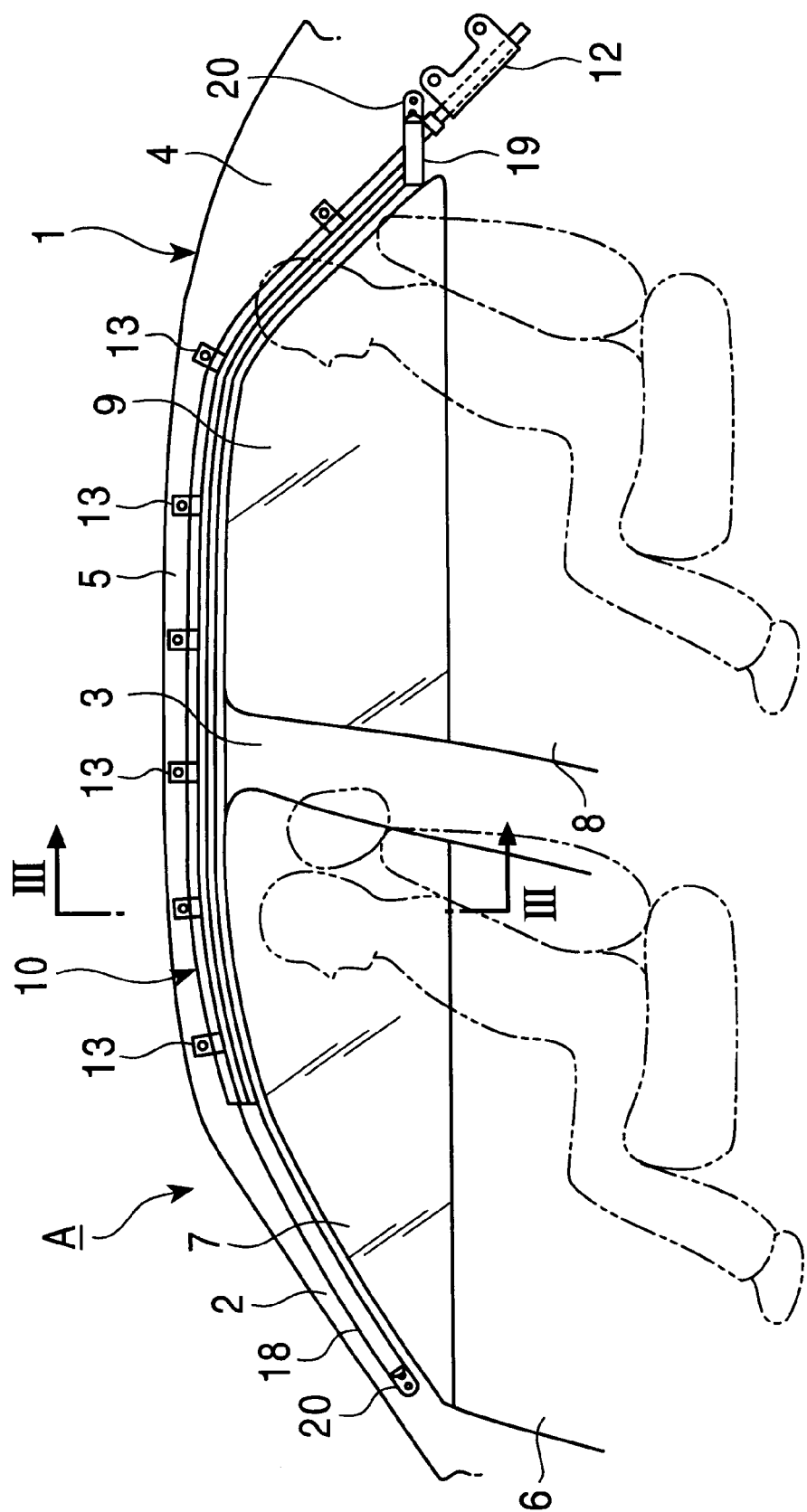
FIG. 2 is a view equivalent to FIG. 1 in the housed condition of an airbag.

As shown in FIG. 2, an airbag 10 is folded and housed in the range from a front end of the roof side rail 5 to the quarter pillar 4. An airbag 10 is made by sewing two sheets each other around their peripheries to form into a large bag. In a side view in the expanded condition of the airbag 10 as shown in FIG. 1, the airbag has a shape extending longitudinally. A front edge of the airbag approximately straightly extends in the vertically direction, while a rear edge of the airbag is formed in a slant portion which extends more rearward as going downward. An opening is formed in a lower end of the slant portion, and a hose 11 made of resin is inserted into the opening airtightly. The hose 11 is connected to a cylindrical inflator 12 housing an igniter and an explosive and is also extended through the inside of the airbag 10 along an upper periphery up to a front end of the airbag. The a plurality of gas supply ports are also provided in the middle of hose 11 to uniformly supply a high pressure gas from the inflator 12 into the airbag 10 through the gas supply ports.

Figure 3:
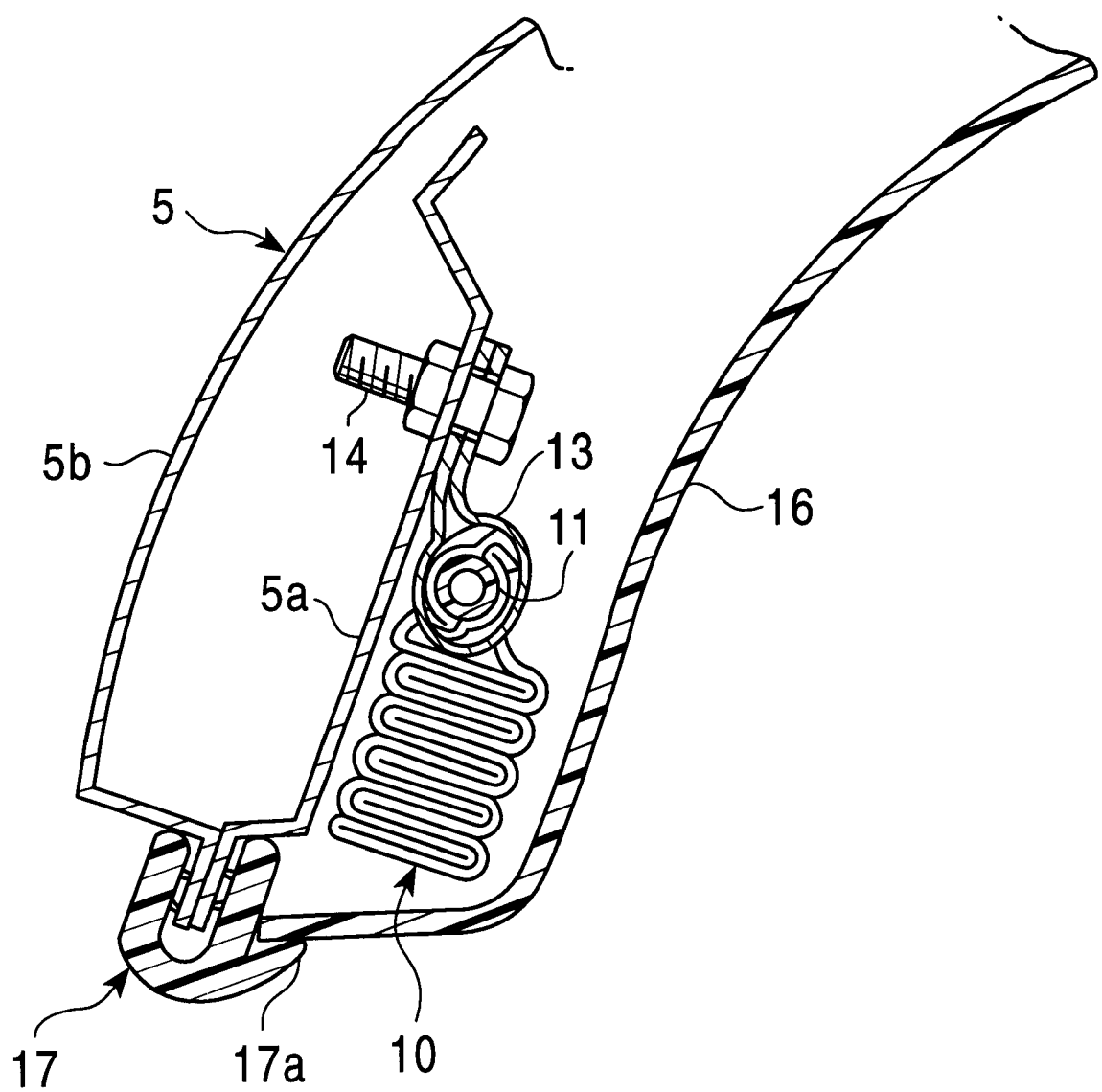
FIG. 3 is a cross sectional view taken from the plane of the line III—III in FIG. 2 showing a structure for fixing an airbag to a roof side rail.

Six fixing brackets 13, 13, . . . , 13 are disposed to the upper periphery of the airbag 10 from the front end to rear end of the air bag with uniformly spacing apart respectively. As shown in detail in FIG. 3, each of the fixing brackets 13 is formed, for example, by bending a steel sheet to clamp the upper periphery of the airbag 10 and the hose 11, and is also fastened to an inner panel 5a of the roof side rail 5 by a bolt 14. That is, the airbag 10 is fixed to the roof side rail 5 at the upper periphery of the air bag by the fixing bracket 13 and is also housed below the fixing bracket between the roof side rail 5 and a roof trim 16 with being folded. In FIG. 3, reference numeral 17 designates a seaming welt for covering a welding flange of the roof inner panel 5a and a roof outer panel 5b. A protruding rib 17a is formed on the seaming welt 17 to be engaged and held with a periphery of the roof trim 16.

Figure 4:
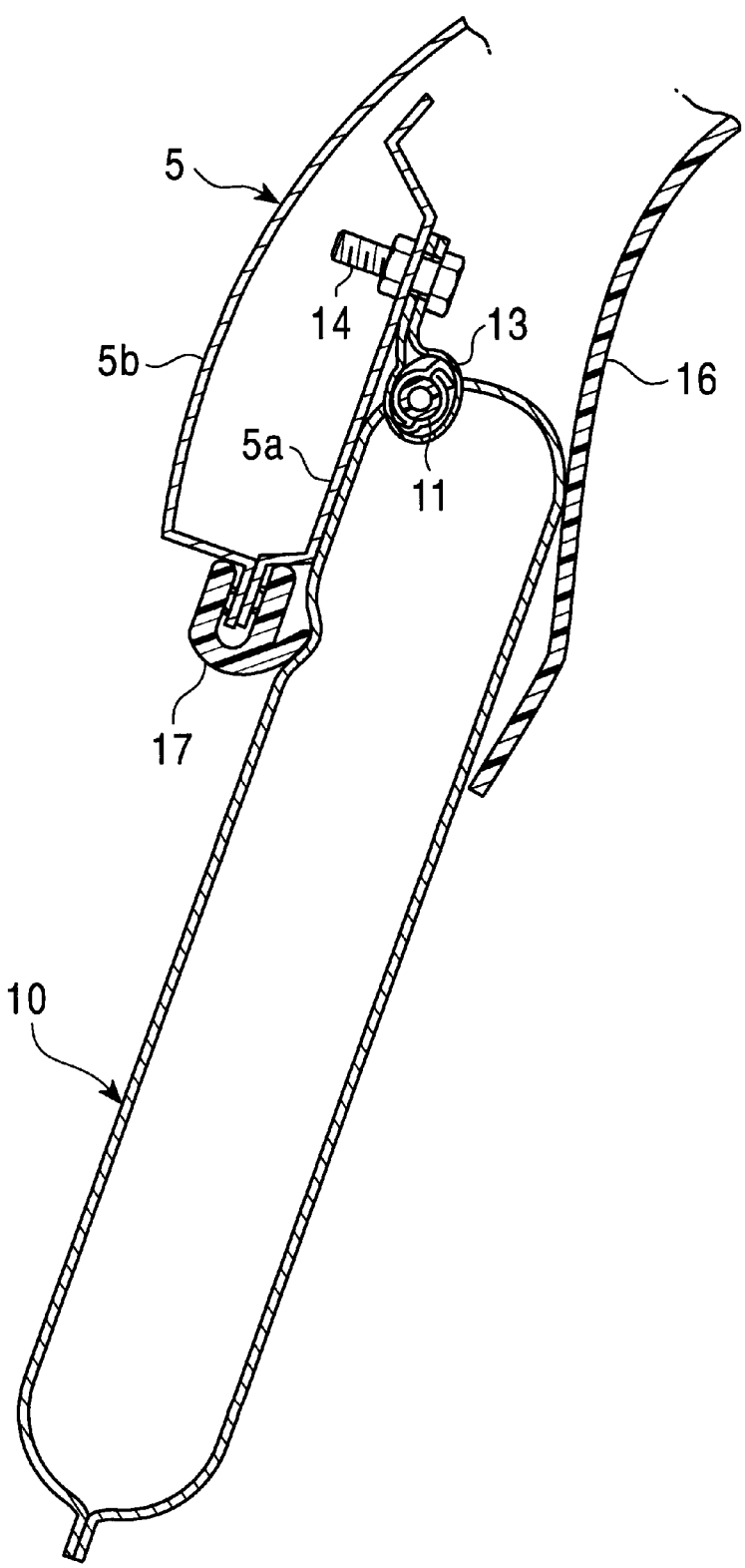
FIG. 4 is a cross sectional view taken from the plane of the line IV—IV in FIG. 1.
Figure 5:
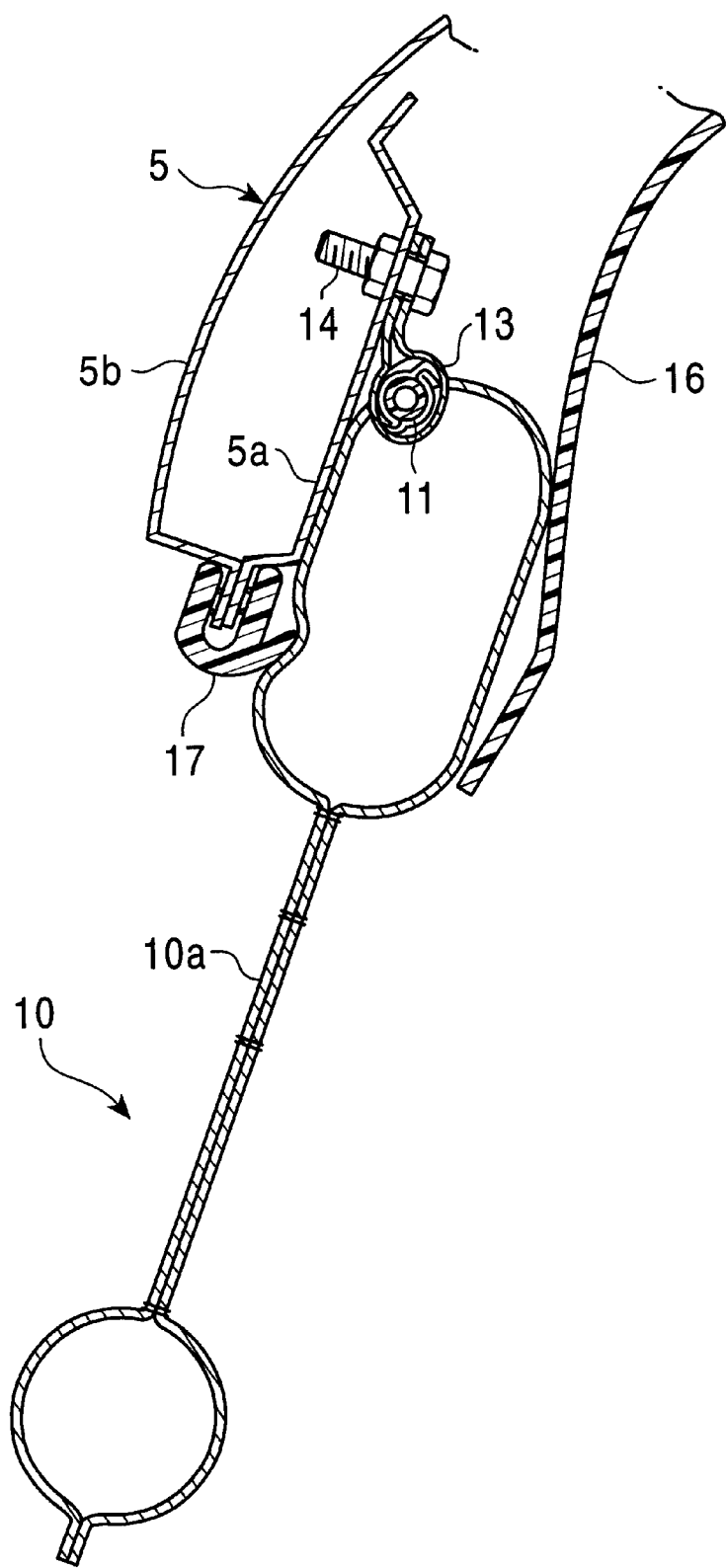
FIG. 5 is a cross sectional view taken from the plane of the line V—V in FIG. 1.

When the impact load is acted on the right side of the vehicle 1 and an ignition signal is then input from a sensor (not shown) to the inflator 12, the airbag 10 is expanded by the high pressure gas supplied from the inflator 12 to push and open the roof trim 16. As shown in FIGS. 4 and 5, the air bag is extended downward to restrain and protect a occupant's head and so prevent the occupant from being thrown out of the vehicle. As respectively shown in FIGS. 1 and 5, a non-expansive area 10a is provided by sewing right and left sheets of the airbag 10 each other at a portion positioned slightly rearward from a central portion of the airbag 10 to control an excessive expansion of both the sheets. The non-expansive area is provided so as not to contact the occupant resulting in reduction of a volume of the airbag 10, a time necessary for the expansion of the airbag, and the overall size of the device.

In general, when the airbag 10 extended longitudinally is widely expanded in the laterally direction in its expanded condition, the airbag 10 is likely to expand toward an occupant and to come in contact the occupant. Such a negative influence can be avoided by providing the non-expansive area 10a in the airbag 10 to properly control a lateral expansion of the airbag.

Figure 6:
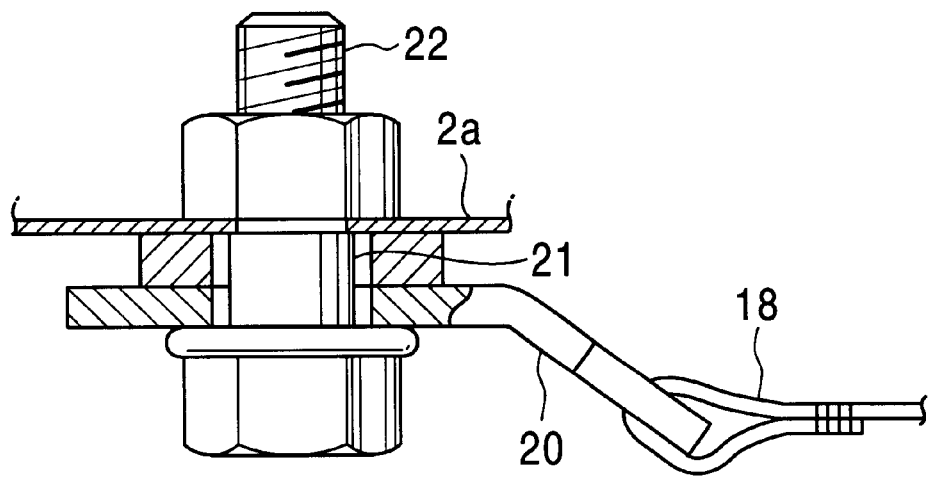
FIG. 6 is a partial enlarged view showing a structure where a front tether is attached to a front pillar.
Figure 8:
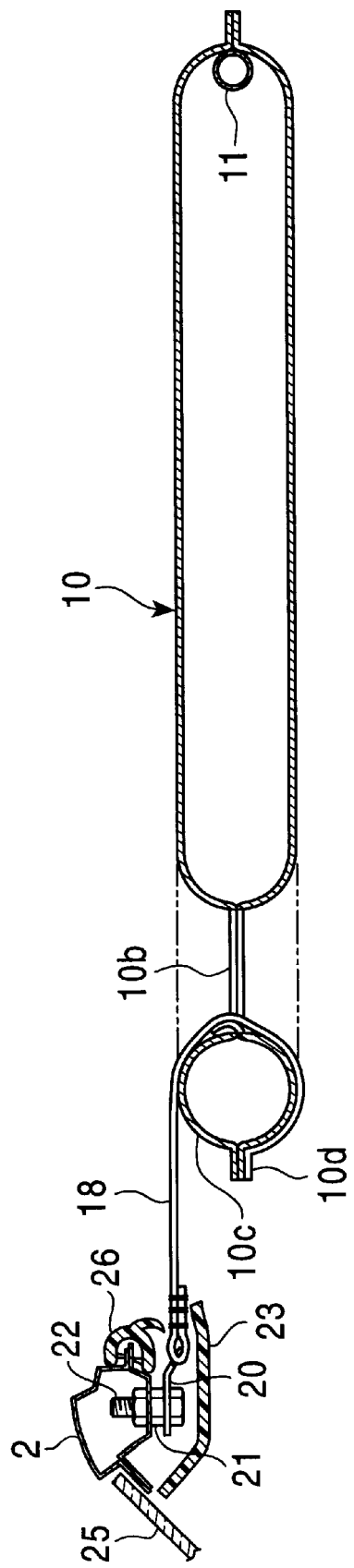
FIG. 8 is a cross sectional view taken from the plane of the line VIII—VIII in FIG. 1.

Tethers 18 and 19 (i.e. a front and rear connecting members respectively) are attached to the front lower end and rear lower end of the airbag 10 respectively for pulling the airbag 10 in the longitudinal direction in its expanded condition. That is, one end of the front tether 18 is attached to the front end of the airbag 10 and another end of the front tether is fixed to a lower end of the front pillar 2. As shown in detail in. FIG. 6, the end of the front tether 18 which is located near to the pillar is fixed to a buckle 20 which is attached rotatably to a bolt 22 together with a collar 21. Thus, the end. is attached to an inner surface of an inner panel 2a of the front pillar 2 by the bolt 22. As shown in FIG. 2 in the housed condition of the airbag 10, the front tether 18 is disposed along the front pillar 2, while, in the expanded condition of the airbag 10, the front tether is rotated around the bolt 22 due to the downward extension of the lower end of the airbag 10. As a result, a condition in which the front tether is longitudinally extended as shown in FIGS. 1 and 8 is created.

Figure 7:
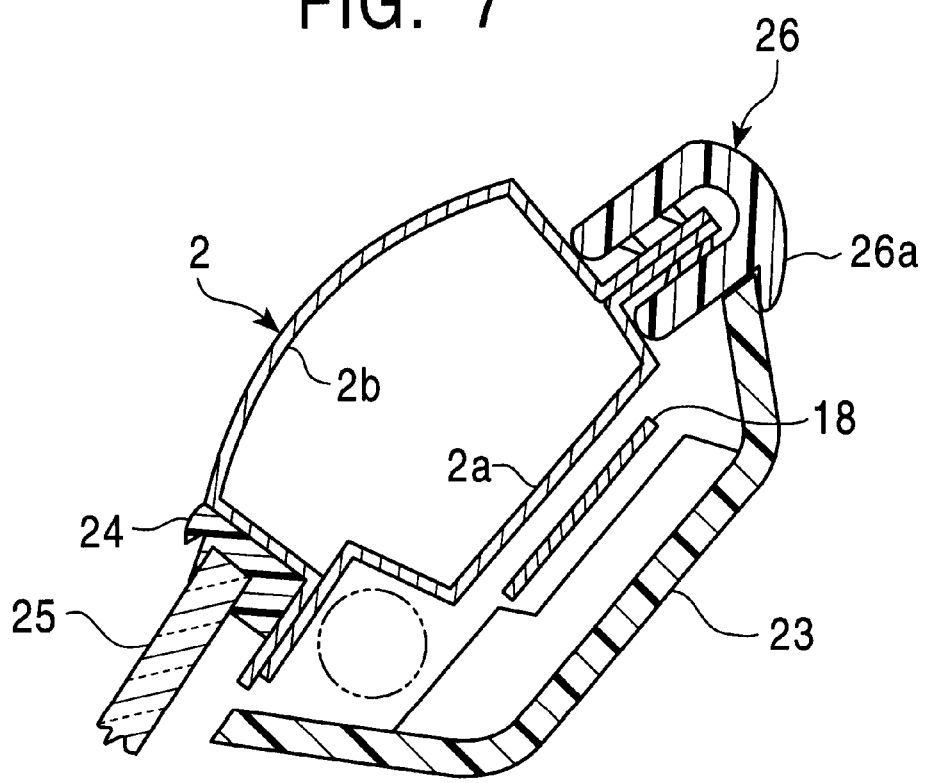
FIG. 7 is a cross sectional view taken from the plane of the line VII—VII in FIG. 2.

One fixing bracket 13 is disposed in the middle of the slant portion. One end of the rear tether 19 which is shorter than the front tether 18 is sewed to the rear end of the airbag 10, i.e. the proximity of the opening into which the hose 11 is inserted. Another end of the rear tether 19 is rotatably attached to a lower end of the quarter pillar 4 via the buckle 20 as same as the front tether 18. When the airbag 10 is in its housed condition shown in FIG. 2, the front tether 18 is housed in the pillar trim 23 as shown in FIG. 7. The fixing bracket 13 disposed in the rear end of the airbag 10 and the rear tether 19 are also housed in a pillar trim. This provides good appearance and an improved the commercial value.

In FIG. 7, reference numerals 2a and 2b respectively designate a pillar inner panel and a pillar outer panel which make up a front pillar 2 having a closed section. A front window 25 is supported by the pillar outer panel 2b via a sealing member 24. A reference numeral 26 designates a seaming welt for covering a welding flange of the pillar inner panel 2a and the pillar outer panel 2b. A protruding rib 26a is formed on the seaming welt 26 for engaging with a periphery of the pillar trim 23 to hold it.

The of airbag 10 according to the present embodiment longitudinally extends as described above and is also not divided into a plurality of small bags as a conventional curtain type airbag, but is formed into one large bag as a whole. Accordingly, when the airbag 10 is transferred from its housed condition shown in FIG. 2 to its expanded condition shown in FIG. 1, the airbag 10 is not very reduced its length in the longitudinal direction, but is likely to generate a slack of the front tether 18 which caused an insufficient longitudinal tension provided to the airbag 10. This might cause a fear that, when the an impact load is acted on a body of a vehicle or the vehicle is then turned over, the occupant might deform the airbag 10 outward to be thrown out of the vehicle through the side window.

Then, in the present embodiment, an ingenious device which is a feature of the present invention is exercised over a connecting structure between the front tether 18 and the front end of the airbag 10 so that a sufficient tension may be provided to the airbag 10 by absorbing the slack of the front tether 18 in the expanded condition of the airbag. Because of the structure described above, even when the impact load is acted on the body of the vehicle or the vehicle is then turned over, the occupant can be protected so as to be secured within the compartment of the vehicle by the airbag 10 to in which the sufficient tension is provided. Thus a vehicle occupant protection performance can be improved.

As particularly shown in FIGS. 1 and 8, a hole 10b is formed on the front end of the airbag 10 with penetrating the airbag 10 laterally. The end portion of the front tether 18 which is located near to the airbag extends with be wound around the expanding portion 10c from a front right side of an expanding portion 10c positioned frontward more than the hole 10b. Then after the end portion passes through the hole 10b and then returns back frontward at an opposite left side, the end portion is sewn together to the seam 10d of the airbag 10 with being wound around the left side of the expansion portion 10c. That is, the expanding portion 10c which is expanded in the expanded condition of the airbag 10 is provided at the front end portion of the airbag 10, the through-hole 10b is formed in the airbag 10 rearward more than the expanding portion 10c (in the direction of central portion of the airbag 10), and the end portion of the front tether 18 which is located near to the airbag 10 is wound approximately one circle around the expanding portion 10c and then is fixed to the front edge of the airbag 10.

According to the structure described above, when the housed airbag 10 is expanded, the expanding portion 10c located at the front end of the airbag 10 is also expanded. As shown in FIG. 8, the end portion of the front tether 18 is wound around the expanding portion 10c and the slack thereon is absorbed thoroughly. Accordingly, even if an amount of slack is generated on the front tether 18, it can be absorbed completely and a sufficient tension can be provided to the airbag 10. In addition, a load provided by the front tether 18 to the airbag 10 is dispersed over a surrounding area of the expanding portion 10c, and thereby a reliability of the airbag 10 can be improved. The hole 10b and the expanding portion 10c of the airbag 10 and a fixing structure of the front tether to them correspond to a slack absorbing device S for absorbing the slack of the tether 18 in the expansion of the airbag 10.

Therefore, in the occupant protection device of the vehicle A according to the present embodiment, when, for example, a vehicle collides to the right side of the vehicle 1 and the impact load which is higher than a predetermined value is acted on the vehicle, the igniter of the inflator 12 is set off in response to the input from the sensor to induce a fast-burn of the explosive and a great amount of gas generated thereby is introduced into the airbag 10 through the hose 11. Then the airbag 10 is rapidly expanded and extended downward from the roof side rail 5 to cover the inside of the front and the rear side windows 7 and 9 and to provide a condition for protecting the occupant.

At that time, the expanding portion 10c at the front end of the airbag 10 is expanded by the high pressure gas introduced therein with having approximately cylindrical shape. At this time, the expanding portion winds up the end portion of the front tether 18 to thoroughly absorb the slack of the tether 18, so that the sufficient level of longitudinal tension can be provided to the airbag 10. Therefore, the restraint performance for the occupant can be secured without dividing the airbag 10 into a plurality of small bags as the conventional curtain type airbag.

Further, since the airbag 10 is not divided and thereby the seam is removed from a contact area with the occupant, the occupant protection performance of the airbag 10 can be improved as a whole. In addition, since there is no need for sewing the airbag 10 to divide it and for sealing the sewed portion, a man-hour for these operations can be saved to reduce the manufacturing cost significantly.

Since the airbag 10 according to the present embodiment is expanded to cover both of the front and the rear side windows 7, 9 of the vehicle including a front seat area as well as a rear seat area, it widely extends in the longitudinal direction and is consequently to have a lower restraint in the lateral direction. Therefore, the present invention provides an extremely useful operational effect in which the slack of the tether 18 can be absorbed by a simple structure as described above and the sufficient level of longitudinal tension can be provided to the airbag 10 with extremely longer length in the longitudinal direction.

Further, in the present embodiment, since the periphery of the front tether 18 is sewed to the airbag 10 using the original seam 10d together, there is no fear of a strength reduction of the airbag due to an increase of the sewing portion.

Although, in the embodiment described above, the end portion of the tether 18 in the airbag 10 side is wound around the expanding portion 10c and the periphery of the end portion is sewed at the seams of the airbag 10 together, the sewing manner is not limited thereto. That is, the periphery of the front tether 18 may unnecessarily be sewed to a vicinity of the seam of the airbag 10. Alternatively, for example, the end portion of the tether 18 is not wound around the expanding portion 10c, but may be simply sewed at a position which is expanded at least in the lateral direction.

Embodiment 2

Figure 9:
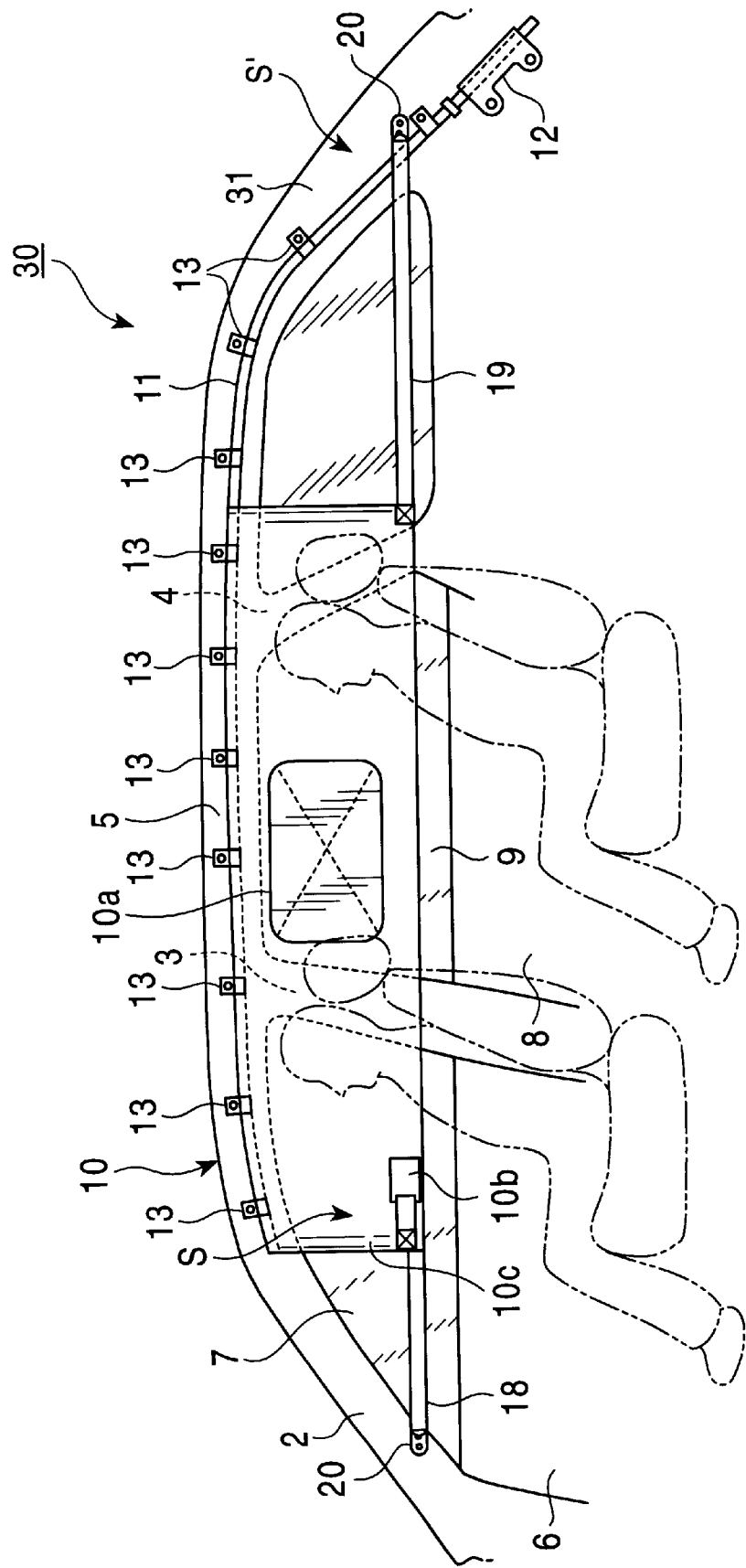
FIG. 9 is a view equivalent to FIG. 1 according to another embodiment of the present invention.
Figure 10:
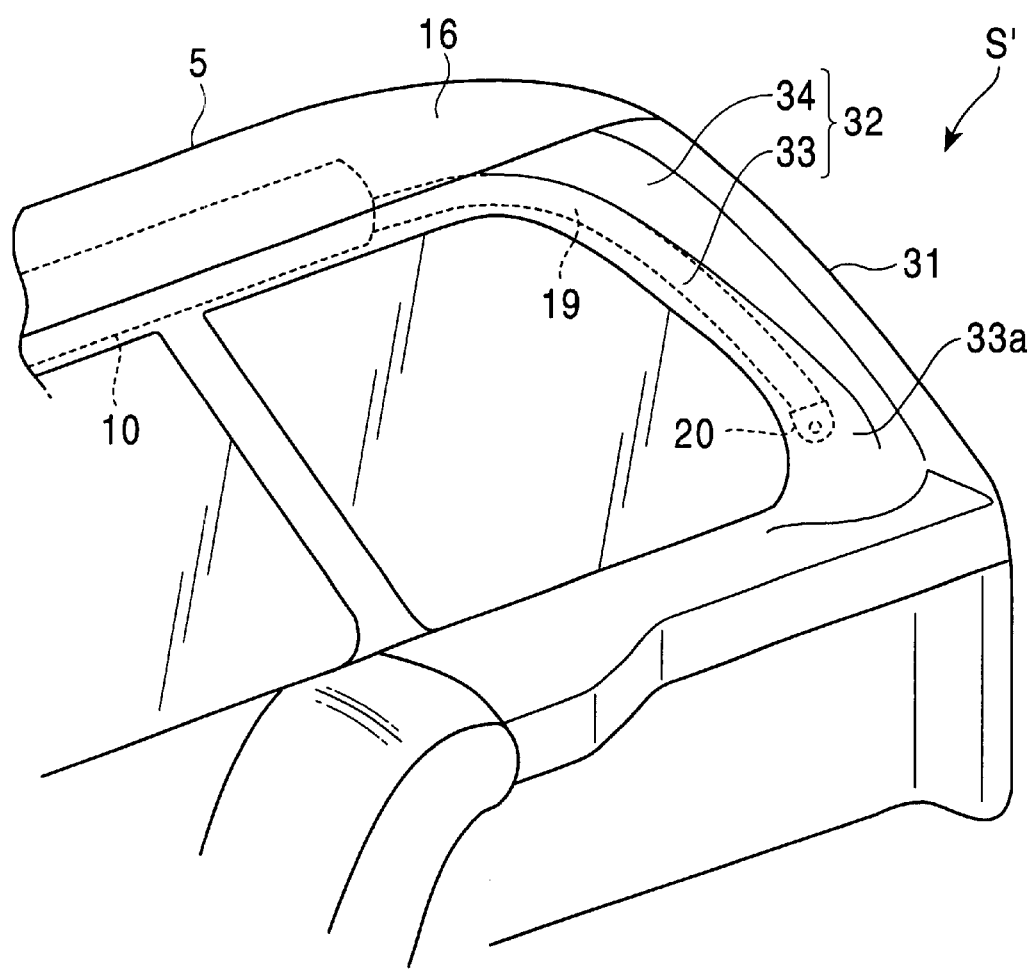
FIG. 10 is a perspective view showing an arrangement where a rear tether is housed in a rear pillar of a vehicle in the housed condition of an airbag.
Figure 11:
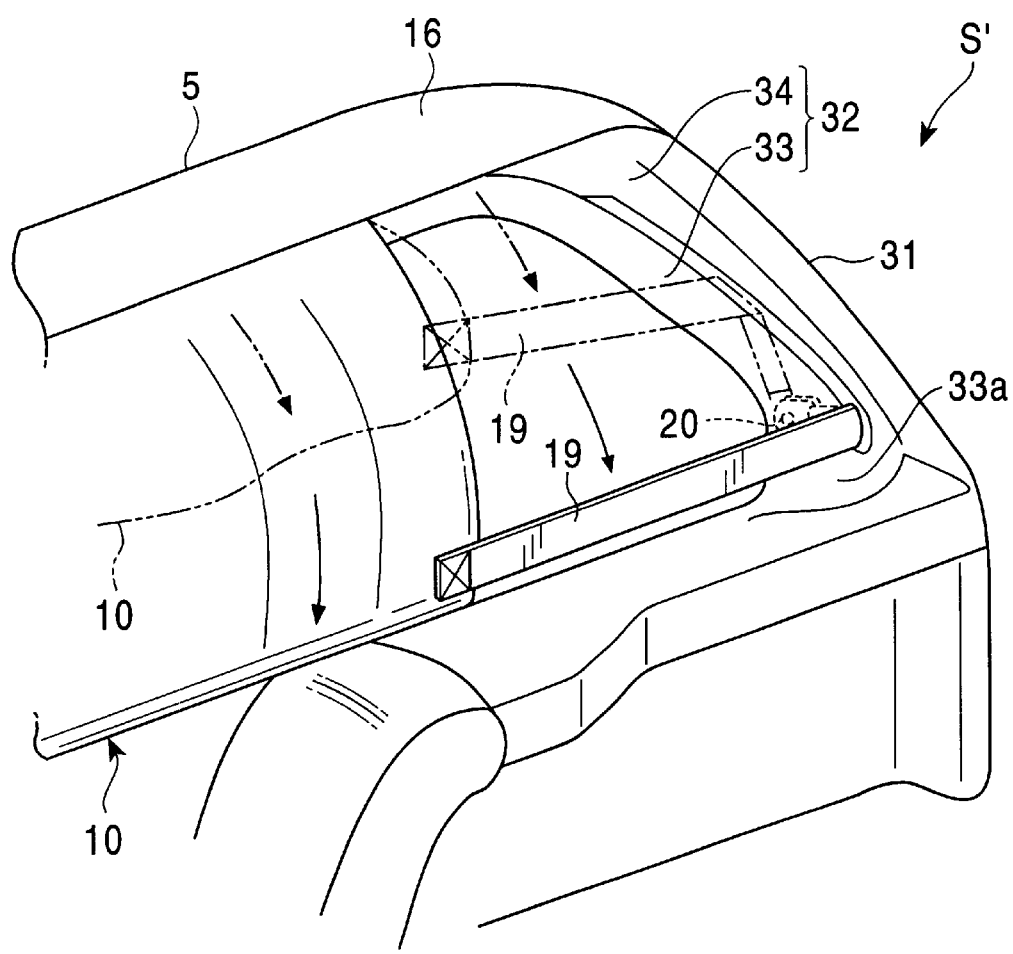
FIG. 11 is a view equivalent to FIG. 10 showing the expanded condition of an airbag.

FIGS. 9 to 11 show another embodiment in which a curtain type airbag device A according to the present invention is applied to a wagon type vehicle 30. Since the curtain type airbag device A according to this embodiment is similar to that of the aforementioned embodiment in a schematic structure of the airbag 10, an attaching structure of the front tether 18 or the like, the similar members are represented by the similar reference numerals and a description for them will be omitted. A feature of the curtain type airbag device A according to this embodiment is that a slack absorbing device S' for absorbing a slack of the rear tether 19 in the expansion of the airbag 10 is provided between the rear tether 19 and a rear pillar 31.

As shown in detail in FIG. 10, in the housed condition, the airbag 10 is folded and housed between the roof side rail 5 and the roof trim 16 as same as the case of the aforementioned embodiment, and also the rear tether 19 is housed between the rear pillar 31 and a pillar trim 32. In this condition, one end of the rear tether 19 which is located near to the airbag 10 is in a higher position than the other end of the airbag which is located near to the rear pillar 31.

The pillar trim 32 comprises a front frame member 33 and a rear panel member 34. Though not shown in detail, the frame member 33 is fixed to an inner panel of the rear pillar 31 by a bolt and is gradually protruded into the compartment along an upper side to a lower side to form a bank portion 33a at a lower end thereof with protruding toward an inside of the compartment. Further this frame member 33 has high rigidity capable of resisting an expanding force of the air bag 10. The panel member 34 is engaged with a rear periphery of the frame member 33 at a front end thereof and is held so as to fit an inside of the rear pillar 31.

When a high pressure gas is supplied from the inflator 12 and the airbag 10 is expanded as shown in FIG. 11, the airbag 10 pushes and opens the roof trim 16 and extends downward into the compartment. Then, the rear tether 19 attached to a lower portion of the airbag 10 also pushes open the panel member 34 of the pillar trim 32 to move downward as shown by chain lines in the same drawing. At that time, since the rear tether 19 always moves downward along the frame member 33, the rear tether 19 is pushed toward the inside of the compartment as the airbag 10 is expanded, and eventually is pushed by the bank portion 33a of the frame member 33 toward the inside of the compartment to be formed into approximate L-shape as shown by real lines in the same drawing when the airbag 10 is completely expanded.

Accordingly, in this embodiment, since the rear tether 19 is pushed out toward the inside of the compartment along the frame member 33 by a downward expanding force of the airbag 10, the slack of the rear tether 19 can be absorbed and a sufficient tension is provided to the rear tether. Thus, the same operational effect with that of the aforementioned embodiment can be achieved, which allows to accomplish an improvement of the occupant protection performance as well as a cost reduction of the airbag 10, while securing a occupant restraint performance. In addition, the vehicle occupant protection device performance of the airbag 10 can be further improved by providing a force, which directs the airbag toward the inside of the compartment, to the airbag 10 via the rear tether 19.

The tame member 33 corresponds to a guide member for guiding the rear tether 19 in the expansion of the airbag 10, and a slack absorbing device S' is configured by the frame member 33, the bank portion 33a formed on the lower end thereof and an arrangement and structure of the rear tether 19. Since the slack absorbing device S' has no necessity to form the through-hole 10b on the airbag 10 as of the slack absorbing device S applied to the front end of the airbag 10, such a problem as to increase the seams in the airbag or to make the structure thereof complicated can be avoided.

Embodiment 4

Figure 12:
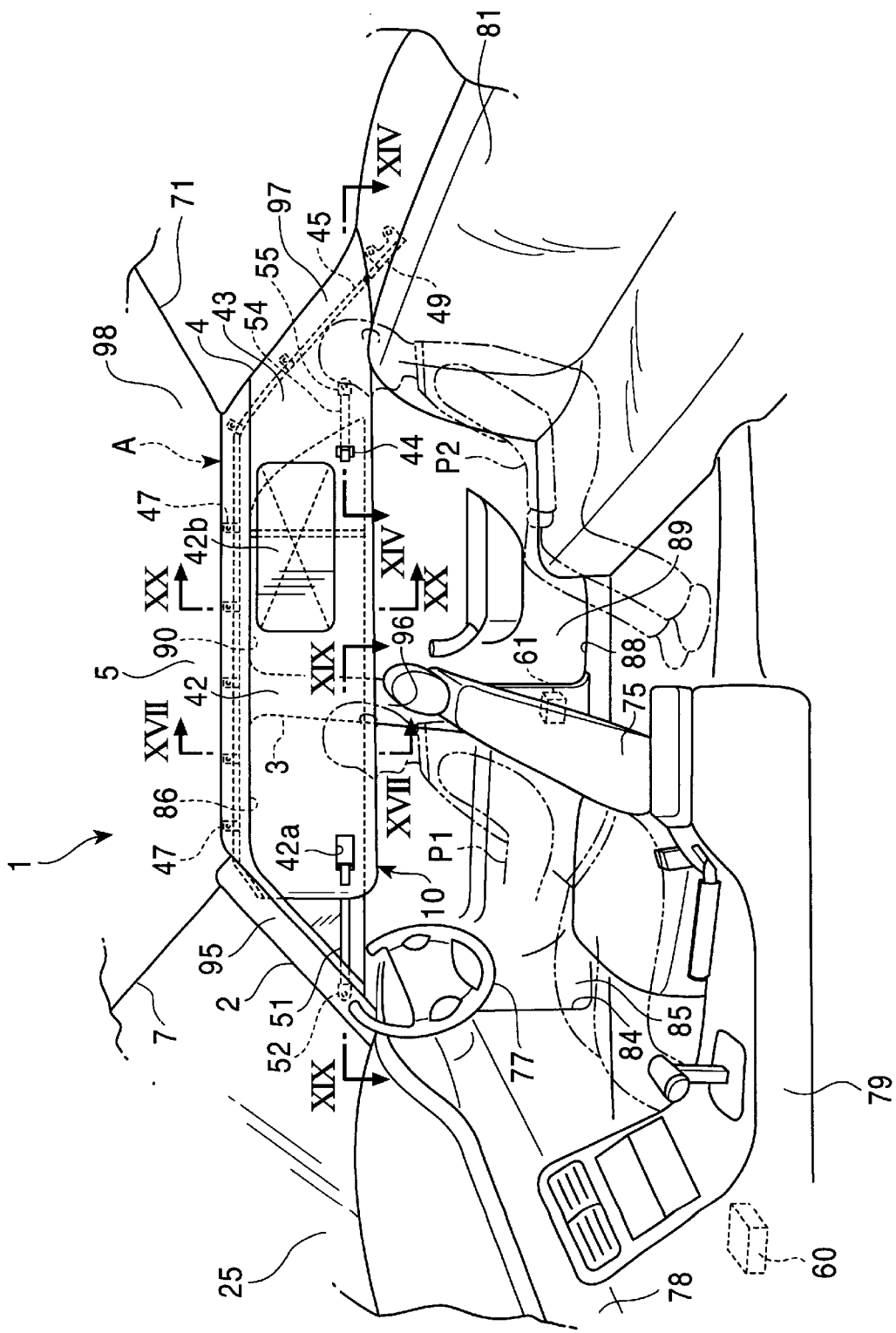
FIG. 12 is an elevational view showing an airbag of an occupant protection device according to another embodiment of the present invention, illustrating in an expanded condition of the air bag viewed from an inside of a compartment of a vehicle.
Figure 13:
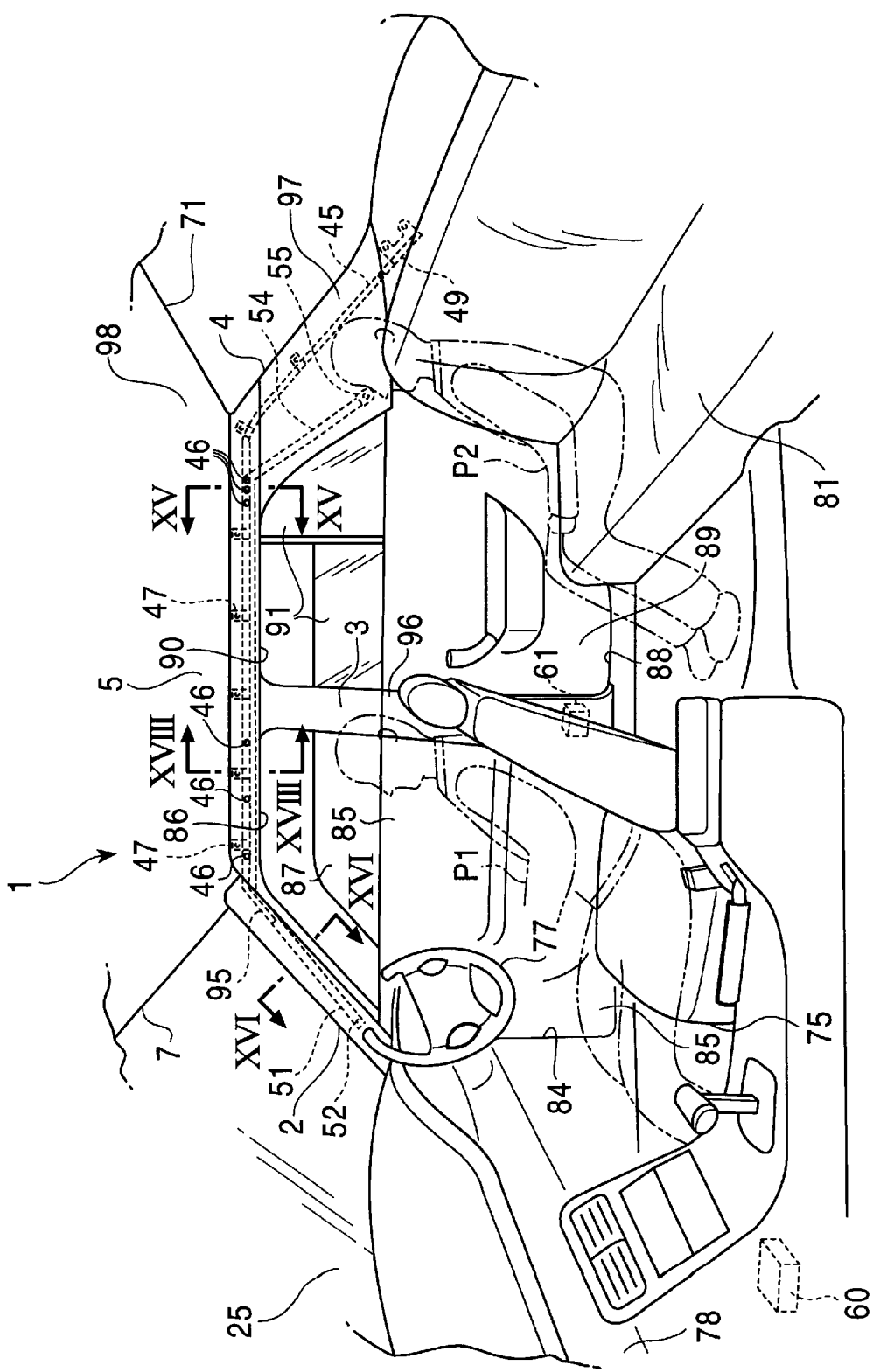
FIG. 13 is an elevational view similar to FIG. 12 illustrating in a housed condition of the airbag of the occupant protection device.

FIGS. 12 and 13, show an inside of a compartment of a vehicle equipped with an occupant protection device A according to an embodiment of the present invention illustrating in an expanded condition of an airbag by FIG. 12 and a housed (un-expansion) condition of the airbag by FIG. 13.

In FIGS. 12 and 13, reference numeral 1 generally designates a body of the vehicle in which a compartment 1a of the vehicle is formed therein. The body comprises a front pillar 2 inclined rearward, a center pillar 3 extended vertically, a rear pillar 4 inclined frontward, a roof connected to each upper end of pillars 2 to 4 and a floor by a roof rail 5. A front window glass 25 is fit in a front window 7 which employs the front pillar 2 and a front-half of the roof as a part of a window frame. A rear window glass is fit in a rear window 71 which employs the rear pillar 4 and a rear-half of the roof as a part of a window frame.

Reference numeral 75 designates a front seat (driver's seat) installed in a front side of the compartment of the vehicle, on which a driver P1 as an occupant takes a seat Reference numeral 77 designates a steering wheel disposed on front of the front seat 75, reference numeral 78 designates an instrument panel disposed on a front end of the compartment of the vehicle, and reference numeral 79 designates a floor console installed on the floor next to the front seat 75. Reference numeral 81 designates a rear seat installed in a rear portion of the vehicle compartment, on which an occupant P2 takes a seat.

In a left and right sides (the right side is shown in the drawing) of the vehicle body 1, a front door 85 is fit in an front opening 84 defined by the front pillar 2, the center pillar 3, the roof and the floor so as to be opened and closed. A rear door 89 is fit in a rear opening 88 defined with the center pillar 3, the rear pillar 4, the roof and the floor so as to be opened and closed. A window 86, 90 is formed on an upper portion of the door 85, 89 in which a window glass 97, 91 is opened and closed (a rear-half portion of the window 90 of the rear door 89 is a fixed sash window where the window glass 91 cannot be opened). Thus, the front pillar 2 is disposed on a front side of the window 86 of the front door 85 extending approximately vertically along a front edge of the front window 86. The rear pillar 4 is disposed on a rear side of the window 90 of the rear door 89 extending approximately vertically along a rear edge of the rear window 90. The roof rail 5 (which is a part of the roof) is disposed on respective upper ends of the front pillar 2, the center pillar 3 and the rear pillar 4 so as to connect them each other extending along a longitudinal direction of the vehicle body. The rear pillar 4 is disposed so as to be located in a side of the occupant P2 seated on the rear seat 81.

As shown in FIGS. 14, 16–18 and 20, each of the front pillar 2, the roof rail 5 and the rear pillar 4 is formed by uniting an outer panel 73 positioned on an outer side of the vehicle compartment and an inner panel 74 positioned on an inner side of the vehicle compartment into one body at a edge of the openings on the side of the vehicle body 1. A seaming welt 93 is engaged with and fixed to this united edge. This seaming welt 93 includes an engaging rib 93a which comprises a protruded line projecting toward an inside of the vehicle compartment. A front pillar trim 95 is disposed on a side of the vehicle compartment of the front pillar 2 (i.e. a surface of the inner panel 74) which is a part of the vehicle body 1, in order to cover the inner panel 74. A center pillar trim 96 and a rear pillar trim 97 are respectively disposed on the center pillar 3 and the rear pillar 4 at the side of the vehicle compartment to cover the inner panel 74. A roof trim 98 is disposed on the roof rail 5 at the side of the vehicle compartment (lower side) to cover the inner panel 74. Each edge of the trims 95–98 is engaged with and fixed to the engaging rib 93a of the seaming welt 93.

A predetermined width of space is provided between the inner panel 74, which is of the front pillar 2, the rear pillar 4 and the roof rail 5, and each of the trims 95, 97, 98, i.e. each interior of the trims 95, 97, 98. In this space, an airbag 10 which is expanded when an impact load is acted on the side of the vehicle body 1 is folded and housed. The airbag 10 is housed within the range from the upper end of the front pillar 2 through the roof rail 5 to the upper end of the rear pillar 4 along therewith (see FIG. 7). A gas supply pipe 45 is inserted into and through an upper end of the airbag 10 to continuously extending throughout the airbag 10. The gas supply pipe is fixedly attached to the vehicle body 1 (front pillar 2, roof rail 5 and rear pillar 4) through a plurality of brackets 47, 47 . . . , 47 by a plurality of bolts 48, 48 . . . , 48. Then the airbag 10 is fixedly supported by the front rail 2, the roof rail 5 and the rear pillar 4 through the gas supply pipe 45. A front end portion of the gas supply pipe 45, which is a closed end, is extended up to the upper end of the front pillar 2. On the other hand, a rear end portion of the gas supply pipe 45 is extended downward along the rear pillar 4 and is connected to an inflator 49 (gas generator) disposed in a middle of the center pillar 4. A plurality of discharge ports 46, 46 . . . , 46 are formed on and along the gas supply pipe 45 (the plurality of discharge ports 46, 46 . . . , 46 are represented by dots in FIG. 13 to show only their positions). In particular, three discharge ports 46, 46, 46 which are dispersed with approximately uniform interval are formed in a portion disposed on the roof rail 5 above the front door 85. Other three discharge ports 46, 46, 46 are also formed in a portion disposed between the roof rail 5 above the rear door 89 and a portion above the rear pillar 4. A gas generated by the actuation of the inflator 49 is introduced into the airbag 10 through the gas supply pipe 45 and the discharge ports 46, 46 . . . , 46 of the gas supply pipe to expand the airbag 10. Then each of the trims 95, 97, 98 is disengaged from the engaging rib 93a of the seaming welt 93 by the expansion of the airbag 10 to make an opening between a edge of each of the trims 95, 97,98 and the inner panel 74 so that the airbag 10 can be expanded into the compartment through these openings.

Figure 19:
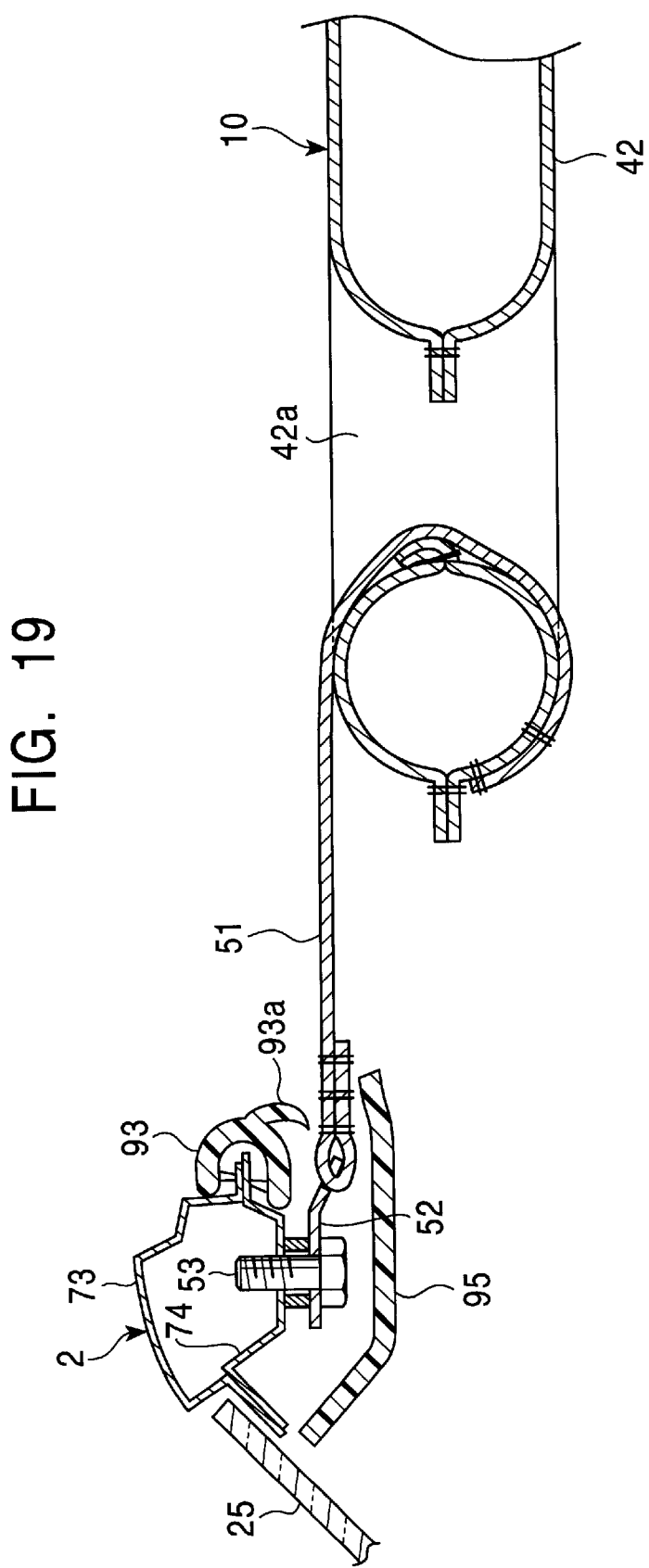
FIG. 19 is a cross sectional enlarged view taken from the plane of the line XIX—XIV in FIG. 12.
Figure 20:
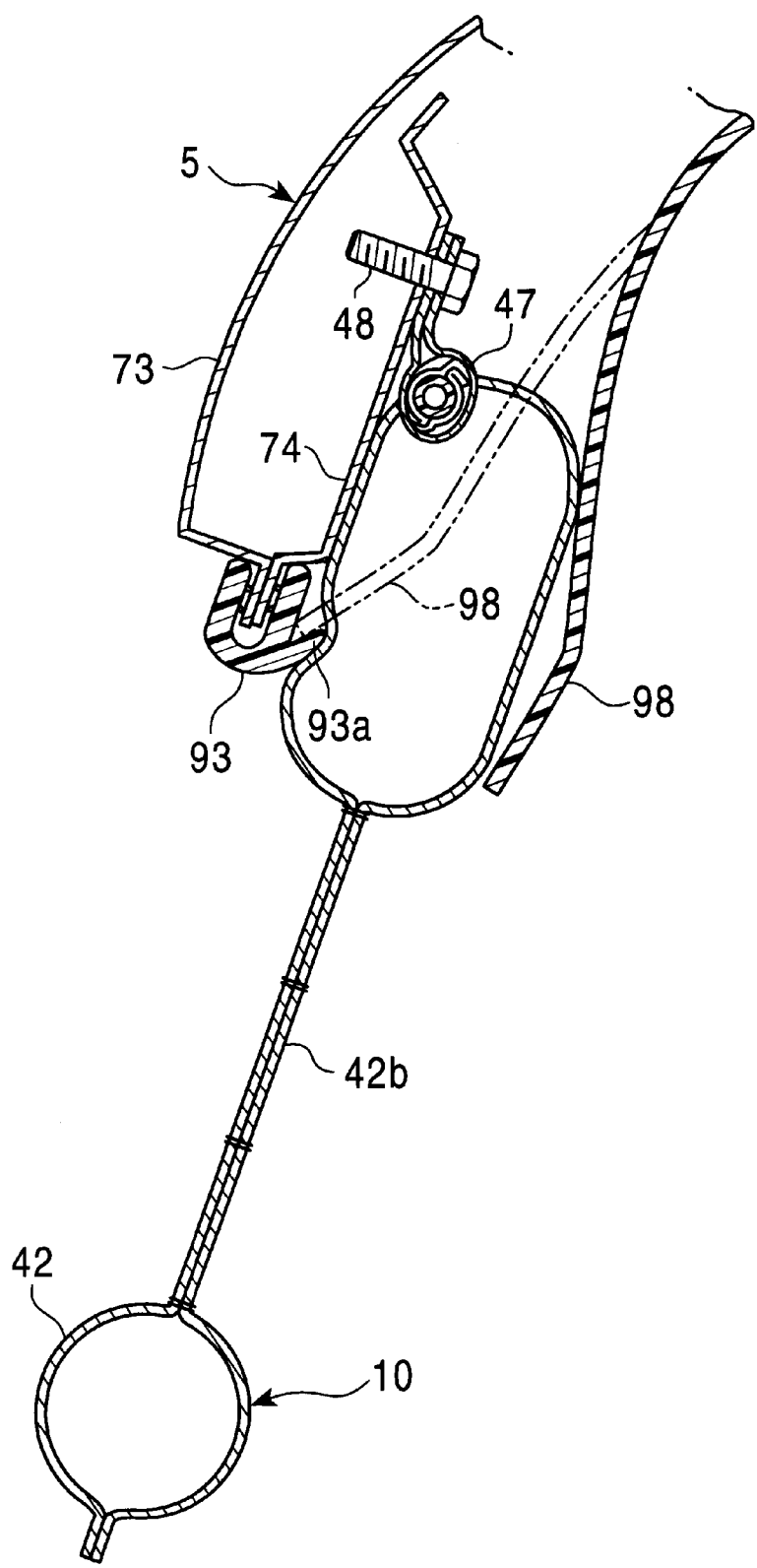
FIG. 20 is a cross sectional enlarged view taken from the plane of the line XX—XX in FIG.12.

As shown in FIG. 12, the airbag 10 has a first expansion area 42 which is expanded to cover the windows 86, 90 of the front door 85 and the rear door 89 continuously. As shown in FIG. 19, a rear end of a flat belt type front connecting member 51 is sewed and fixedly attached to a front lower end of the first expansion area 42 of the airbag 10, and a front end of front connecting member 51 is also connected to a front rotary hook 52. The front rotary hook 52 is rotatably connected to the inner panel 74 of the front pillar 3 by a connecting bolt 53. The font rotary hook is rotated together with the front connecting member 51 around the connecting bolt 53 as the first expansion area 42 of the airbag 10 is expanded. Thus the front pillar trim 95 is disengaged from the engaging rib 93a of the seaming welt 93 and the edge of the front pillar trim 95 is moved toward the vehicle compartment and eventually the front connecting member 51 is moved into the vehicle compartment through the opening between the edge of the front pillar trim 95 and the inner panel 74.

Figure 14:
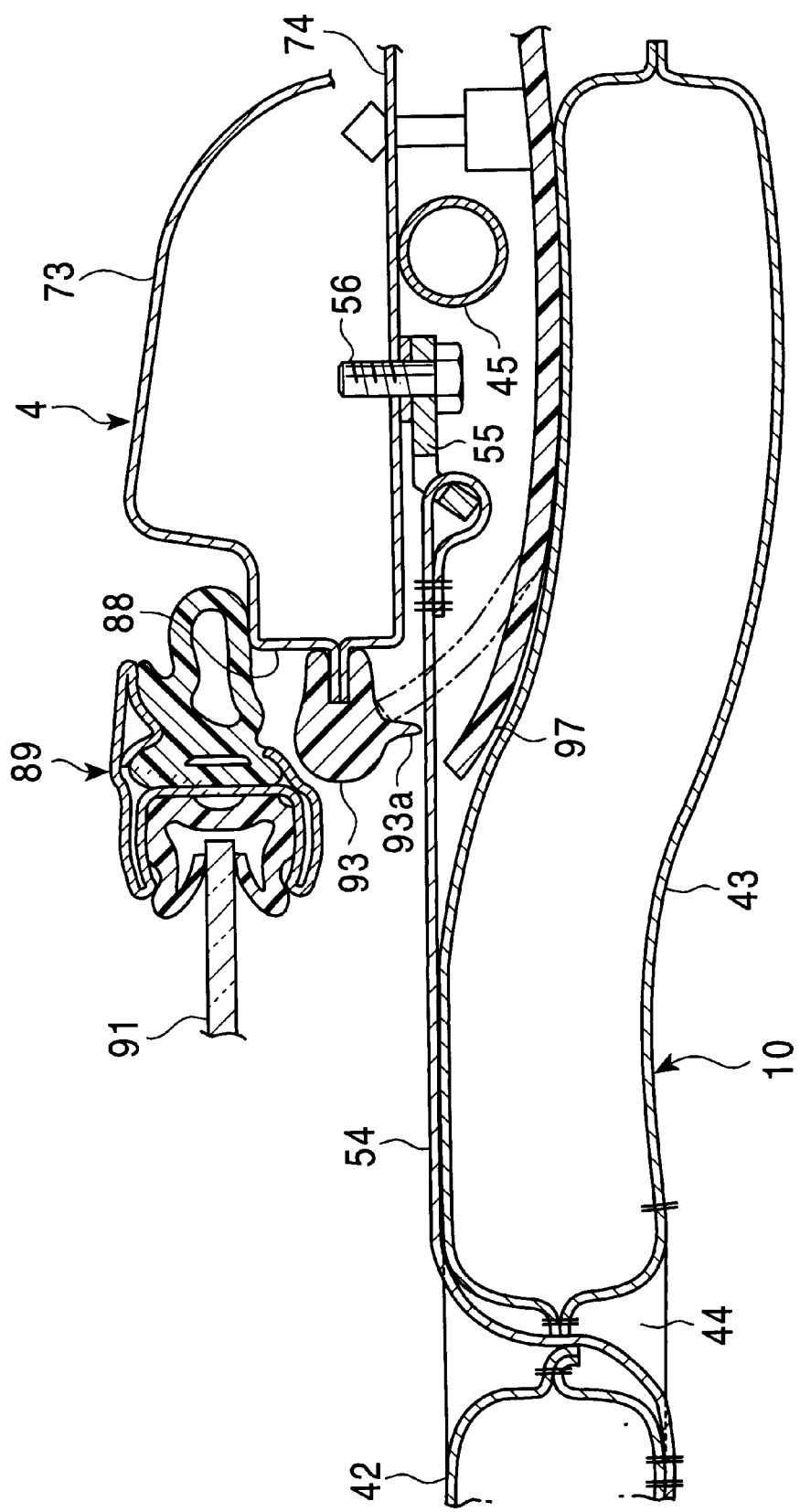
FIG. 14 is a cross sectional enlarged view taken from the plane of the line XIV—XIV in FIG. 12.

On the other hand, as shown in FIG. 14, a front end of a rear connecting member 54 having a similar shape to the front connecting member 51 is sewed and fixedly attached to a rear lower end of the first expansion area 42 of the airbag 10. A rear end of the rear connecting member is also connected to a rear rotary hook 55. This rear rotary hook 55 is similar to the front rotary hook 52. The rear rotary hook is rotatably connected to the inner panel 74 positioned frontward more than the rear pillar 5 through a connecting bolt 56. The rear rotary hook is rotated together with the rear connecting member 54 around the connecting bolt 56 as the first expansion area 42 of the airbag 10 is expanded. Thus the rear pillar trim 97 is disengaged from the engaging rib 93a of the seaming welt 93 and the edge of the rear pillar trim 97 is moved toward the inside of the compartment. Eventually the rear connecting member 54 is moved into the inside of the vehicle compartment through the opening between the edge of the rear pillar trim 37 and the inner panel 74.

The rear end of the front connecting member 51 is passed through a square opening 42a formed on a front lower end of the first expansion area 42 of the airbag 10 from an outer side with respect to the vehicle compartment, and then is turned frontward and sewed to a front side portion of the opening 42a. On the other hand, the front end of the rear connecting member 54 is passed through an opening 44 formed between the rear lower end of the first expansion area 42 of the airbag 10 and a front lower end of a second expansion area 43 described later from an outer side with respect to the vehicle compartment, and then is turned frontward and sewed to a front side of the opening 44 (first expansion area 42). Each of the connecting members 51, 54 is pulled toward the airbag 10 by the expansion of the airbag to make a substantial length of the connecting members 51, 54 shorten. Thus, a longitudinal tension to a lower portion of the airbag 10 is provided by this shortened length of the connecting members. A position to which the tension is provided is set in an effective height, for example, a height at which an impact at the time when the occupant P1, P2 in the vehicle compartment secondarily collides with the window glass 27,31 can be absorbed or the occupant P1, P2 can be prevented from being thrown out of the compartment.

The airbag 10 also has the second expansion area 43 which is to be expanded in a rear side of the fixing portion of the rear connecting member 54 to the airbag 10 to cover approximately all of the rear pillar 4. The second expansion area is connected to a rear end of the first expansion area 42 with allowing the gas. communication therebetween. The opening 44 is formed between the areas 42 and 43. That is, the second expansion area 43 of the airbag 10 is expanded to overlap with the rear pillar 4 located on the side of the occupant P2 seated on the rear seat 81 when viewed from the side of the vehicle. As shown in FIG. 14, the rear end portion of the first expansion area 42 and second expansion area 43 of the airbag 10 and the rear connecting member 54 are housed in the rear trim 97 (in a space between the rear trim 97 and the inner panel 74 of the rear pillar 4) and these are run out from a front end of the rear trim 97 in the expansion of the airbag.

Figure 15:
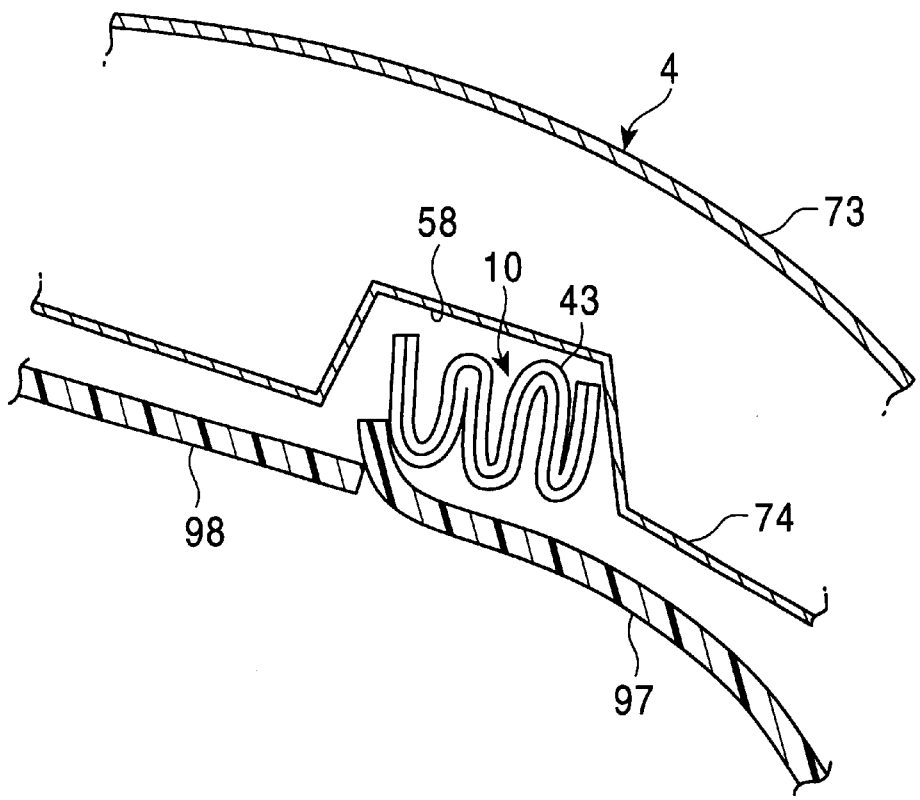
FIG. 15 is a cross sectional enlarged view taken from the plane of the line XV—XV in FIG. 13.
Figure 16:
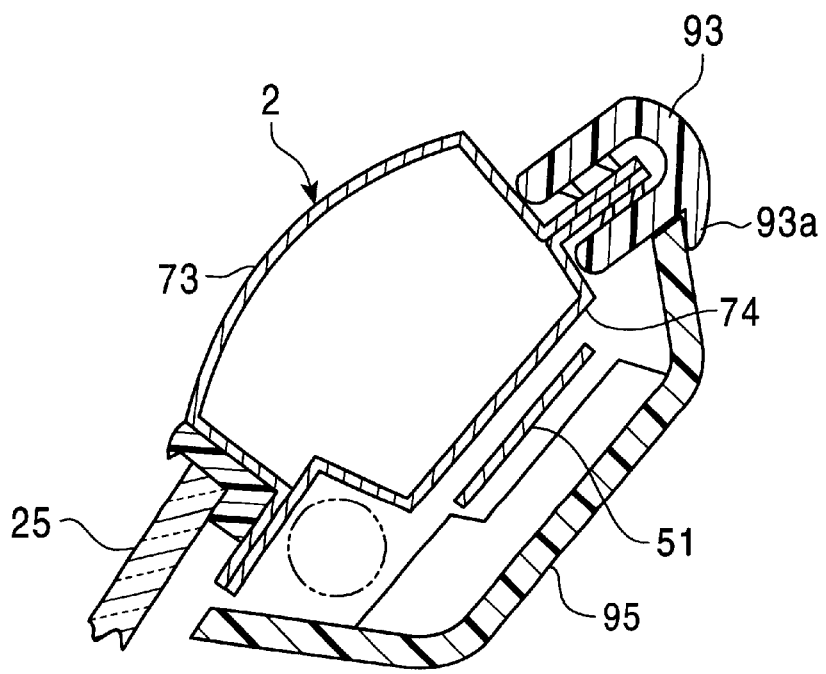
FIG. 16 is a cross sectional enlarged view taken from the plane of the line XVI—XVI in FIG. 13.
Figure 17:
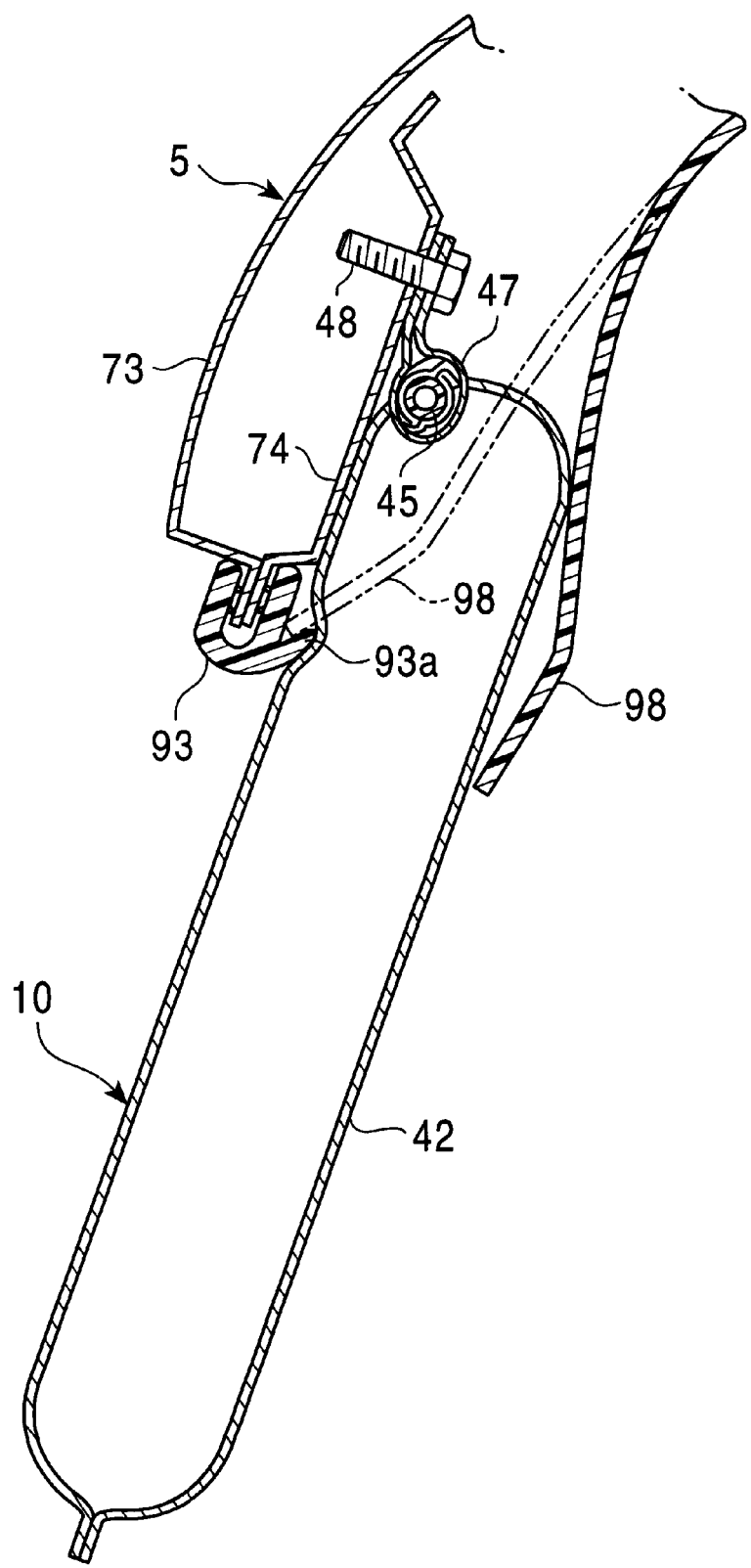
FIG. 17 is a cross sectional enlarged view taken from the plane of the line XVII—XVII in FIG. 12.
Figure 18:
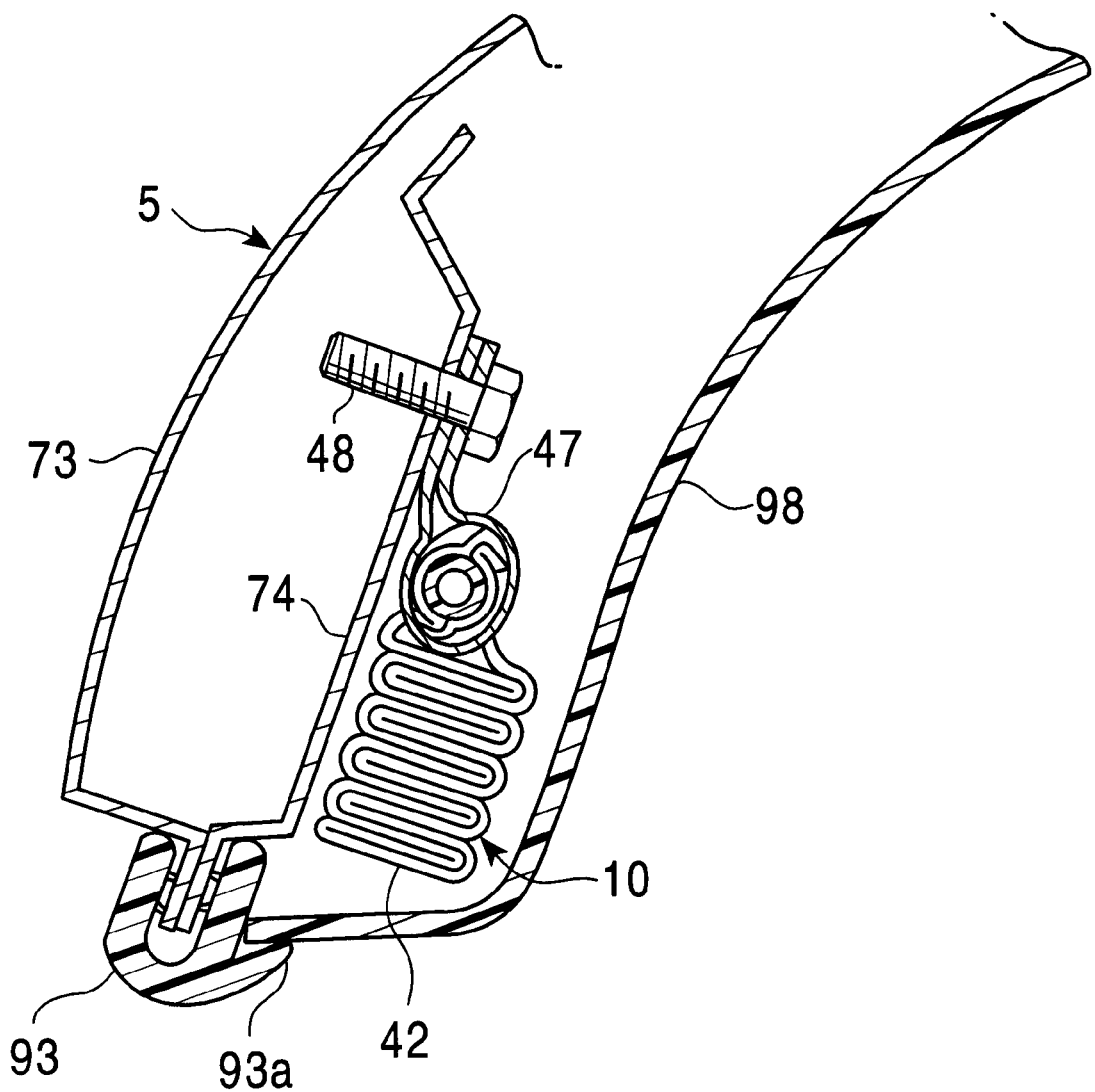
FIG. 18 is a cross sectional enlarged view taken from the plane of the line XVIII—XVIII in FIG.13.

As shown in FIG. 15, on the inner panel 74 of the roof rail 5 on the rear pillar 4, the rear pillar trim 97 covering the rear pillar 4 and the roof trim 98 covering the roof rail 5 are disposed with overlapping a edge of the roof trim 98 onto a edge of the rear pillar trim 97. A guide recess 58 is formed on the inner panel 74 at a portion corresponding to an overlapping of the trims 97 and 98. The second expansion area 43 of the airbag 10 is fold and housed in the guide recess 58 to guide an expanding direction of the second expansion area 43. Thus, when the second expansion area 43 of the airbag 10 is expanded, the expanding airbag 10 pushes out the edge of the roof trim 98 which is overlapped to the rear pillar trim 97, via the rear pillar trim 97 to expand into the vehicle compartment.

A part of the gas supply pipe 45 is inserted into and through the second expansion area 43 of the airbag 10. Two discharge ports 46, 46 are formed in this inserted area (i.e. upper side of the rear pillar 4). That is, though a volume of the second expansion area 43 is smaller than that of the first expansion area 42, the number of the discharge port 46 per unit volume of the second expansion area 43 is larger than that of the first expansion area 42. Accordingly the second expansion area 43 of the airbag 10 is expanded more quickly than the first expansion area 42.

In addition, since the inflator 49 is disposed on a lower end portion of the rear pillar 4, the gas is introduced into the gas supply pipe 45 from a rear side of the vehicle body 1, which also assist an earlier expansion of the second expansion area 43 of the airbag 10 comparing with the first expansion area 42.

As shown in FIG. 12, an airbag control unit 60 for controlling an actuation of the inflator 49 is disposed on the instrument panel 18, and an impact sensor 61 for detecting an impact in the side impact of the vehicle is disposed on a lower portion of the center pillar 4.

A non-expansive area 42b is formed on the first expansion area 42 of the airbag 10 at a portion positioned approximately corresponding to a front portion of the window 90 of the rear door 89. The non-expansive area 42b is formed by sewing an outer side sheet and an inner side sheet of the airbag 10 together so as to almost came in contact with each other. This prevents an excessive lateral expansion of the airbag 10, and therefore an inner surface of the airbag 10 can be prevented from coming close to the occupant.

Accordingly, in this embodiment, when the impact load is acted on the side of the vehicle 1 in the side impact of the vehicle or the like, the impact sensor 61 detects it, and, upon receiving an output signal from the impact sensor 61, the airbag control unit 60 actuates the inflator 49 to generate a high pressure gas. This high pressure gas is introduced into the airbag 10 through the gas supply pipe 45 and the discharge ports 46, 46, . . . formed on the gas supply pipe to expand the airbag 10. Thus the expanding airbag 10 disengages each of the trims 95, 97, 98 from the engaging rib 93a of the seaming welt 93 and then expands through the opening between each of the trims 95, 97, 98 and the inner panel 74 into the compartment.

The airbag 10 is expanded separately into the first expansion area 42 covering most area and the second expansion area 43 covering rear end area. Hereat the first expansion area 42 is expanded to cover the windows 86, 90 of the front and the rear doors 85, 89. Due to the expansion of the first expansion area 42 of the airbag 10, each of the front and the rear connecting members 51, 54 is run out into the compartment through the opening between the edge of the pillar trim 95, 97 and the inner panel 74 respectively and is pulled by the airbag 10. Thus the longitudinal tension is provided to the lower portion of the airbag 10 by the connecting members 51 and 54. This makes it possible to absorb the impact generated by the secondary collision of the occupants P1, P2 toward the window glasses 87, 91 and to prevent the occupants P1, P2 from being thrown out of the windows 86, 90.

On the other hand, the second expansion area 43 of the airbag 10 is expanded in the rear side of the first expansion area 42 to cover almost all of the rear pillar 4. According to this, when the occupant P2 seated on the rear seat 81 secondarily collides with the rear pillar 4, the impact to the occupant P2 can be absorbed and mitigated by the second expansion area 43. Since the second expansion area 43 is expanded in a rear side area of the fixing portion of the rear connecting member 54 to the airbag 10 and makes a soft area where no longitudinal tension is provided by the front and the rear connecting members 51, 54, the second expansion area 43 provides an impact absorbing characteristic superior to that of the first expansion area 42 where the tension is provided by the connecting members 51, 54. In addition, since the rear pillar 4 is disposed on the side of the occupant P2 seated on the rear seat 81 and the second expansion area 43 of the airbag 10 is expanded so as to overlap with the rear pillar 4 when viewed from the side of the vehicle, a reaction force of the impact generated by the collision of the occupant P2 seated on the rear seat 81 toward the rear pillar 5 when the impact load is acted on the side of the vehicle body 1 can be supported by the rear pillar 4. Thereby, the impact on the occupant P2 seated on the rear seat 81 can be surely absorbed and mitigated.

A rear end portion of the first expansion area 42 and the second expansion area 43 of the airbag 10 and the rear connecting member 54 are housed in the pillar trim 97 covering the rear pillar 4 in the vehicle compartment, and are run out the front end of the rear pillar trim 97 to be expanded into the compartment. Thus, both of the rear end portion of the first expansion area 42 of the airbag 10 to be expanded in a front side of the front end of the rear pillar trim 97 and the second expansion area 43 to be expanded in a rear side of the front end of the rear pillar trim 97 can be housed to be hidden from the inside of the vehicle compartment, and thereby the airbag 10 can be housed while keeping good appearance.

The second expansion area 43 of the airbag 10 is expanded earlier than the first expansion area 42. This makes it sure further to protect the occupant P2 seated on the rear seat 81 even when the rear pillar 4 is protruded more toward the vehicle compartment comparing with the windows 86, 90 of the front and the rear doors 85, 99 by the rear pillar trim 97 and is located closer to the occupant P2 seated on the rear seat 81, because the second expansion area 43 positioned corresponding to the rear pillar 5 which is disposed close to the occupant P2 is expanded earlier.

In the above embodiment, while the rear connecting member 54 is connected to the rear end of the first expansion area 42 of the airbag 10 and the second expansion area 43 of the airbag 10 is also expanded rearward more than the fixing portion where the rear connecting member 54 is fixed to the airbag 10, another arrangement may be alternatively employed. That is, the rear connecting member 54 may be connected to the rear end of the second expansion area 43 of the airbag 10, and the second expansion area 43 of the airbag 10 may be expanded into the vehicle compartment positioned rearward more than an exit portion through which the first expansion area 42 is expanded into the vehicle compartment 2. In this case, when the airbag 10 is expanded, the impact at the time when the occupant P2 seated on the rear seat 81 secondarily collides with the rear pillar 5 can be absorbed and mitigated by the second expansion area 43.

While, in the above embodiment, the second expansion area 43 of the airbag 10 is expanded to cover almost of all the rear pillar 5, it may be expanded to cover at least a part of the rear pillar 4.

Though, in the above embodiment, the airbag 10 is housed along the front pillar 2, the roof rail and the rear pillar 4 of the vehicle body 1, it may be housed at least along the roof rail 5.

Though, in the above embodiment, the impact at the time when the occupant P2 seated on the rear seat 81 secondarily collides with the rear pillar 5 disposed on the side of the occupant is absorbed by the second expansion area 43 of the airbag 10, this concept may be applied to another case where the impact at the time when the occupant P1 seated on the front seat 75 secondarily collides with the center pillar 3 may be absorbed in the same manner on the assumption that the center pillar 3 is replaced by a virtual rear pillar 4.

Further, the present invention is not limited to the vehicle of the above embodiment having two doors 85, 86 on a side of the vehicle body 1, but may be applied to any type of vehicle having a rear pillar in a rear side of the window including a vehicle having one door in a side thereof.

The present invention is not limited to the embodiments described above, but includes various types of possible embodiments. That is, though the slack absorbing device S for absorbing the slack of the tether is applied to the front side of the airbag 10 in the one embodiment and another type slack absorbing device S' is applied to the rear side of the airbag 10 in another the embodiment, the arrangement is not limited to these manners, but either of the slack absorbing devices S or S' can be applied to either of the front or the rear side of the airbag.

As described above, according to the occupant protection device for a vehicle of the present invention, there is provided a curtain type airbag device in which the airbag is expanded from the roof side rail downward to cover the inside of the side window when the impact load is acted on the side of the vehicle, wherein the front and rear connecting members are respectively attached to the front lower portion and the rear lower portion of the airbag for connecting the airbag to the body of the vehicle and the slack absorbing device is provided to at least one of the connecting members for absorbing the slack of the connecting members in the expansion of the airbag to pull the airbag in the longitudinal direction by the front and rear connecting members and to provide the sufficient tension to the connecting members. Accordingly there is no need to divide the airbag into a plurality of small bags. This results in a reduction of the seams on the airbag, and thereby the occupant protection performance can be improved and the manufacturing cost can be reduced.

In a preferable embodiment according to the invention, the expansion portion disposed in the end of the airbag is expanded and the end portion of the connecting member attached to the expanding portion is displaced at least along the lateral direction, and thereby the slack of the connecting member is absorbed and the sufficient tension can be provided to the airbag.

In another preferable embodiment according to the invention, the expanding portion disposed in the end of the airbag is expanded and the end portion of the connecting member is wound around the expanding portion, and thereby, even when there is an amount of slack of the connecting member, the slack can be completely absorbed and the sufficient tension can be provided to the airbag. In addition, since a load provided by the connecting member to the airbag is dispersed over a surrounding area, a reliability of the airbag can be improved.

In further preferable embodiment according to the invention, the possible deterioration of the occupant protection performance in case where the slack absorbing device is applied to the airbag can be certainly avoided by applying the slack absorbing device between the connecting member and the vehicle body.

In still further embodiment according to the invention, since the connecting member is guided to make the connecting member bend in order to absorb the slack thereon when the end portion of the connecting member which is located near to the airbag is moved downward in the expansion of the airbag, the sufficient tension can be provided to the airbag.

In a preferable embodiment according to the invention, since the connecting member is pushed by the bank portion in the inward direction with respect to a compartment of said vehicle to make the connecting member bend and the whole airbag is pushed in the inward direction with respect to a compartment of said vehicle via the connecting member in the expanded condition of the airbag, the occupant restraint performance can be further improved.

In a further embodiment according to the invention, the possible deterioration of the shock absorbing performance can be avoided by sewing the airbag side end portion of the connecting member to the vicinity of the seams of the airbag and also the possible deterioration of the strength can be avoided by sewing it together on the seams of the airbag.

In a preferable embodiment according to the invention, since the connecting members are hidden behind the interior members, the appearance quality and commercial value can be improved.

In a further preferable embodiment according to the invention, in the airbag widely extending in the longitudinal direction so as to protect the occupants on the front seat and on the rear seat together, absorbing the slack of the connecting members to provide a sufficient tension to the airbag is quite effective.

As described above, in one aspect according to the invention, the vehicle includes: a front pillar and a rear pillar disposed on a front and rear sides of a side window of the vehicle respectively, the front and rear pillars being extended approximately vertically along the front and rear edges of the side window respectively; and a roof rail extended in the longitudinal direction of the vehicle to connect respective upper ends of the front and rear pillars, further the occupant protection device comprising: an airbag including a first expansion area which is housed along at least the roof rail and is expanded into a compartment of the vehicle to cover the side window when an impact load is acted on a side of the vehicle; and a connecting member connected between a rear portion of the first expansion area of the airbag and a body of the vehicle positioned on a rear side of the first expansion area for providing a longitudinal tension to a lower portion of the airbag in the expansion of the airbag, wherein the airbag includes a second expansion area which is expanded rearward more than a fixing portion where the connecting member is fixed to the airbag. In one aspect according to the invention, the airbag includes a second expansion area which is expanded into a compartment of the vehicle positioned rearward more than an exit portion through which the first expansion area is expanded into the compartment of the vehicle. Further, In one embodiment, the second expansion area of the airbag is adapted to be expanded to cover at least a part of the rear pillar. According to the inventions described above, when the impact load is acted on the side of the vehicle, the impact at the time when the occupant secondarily collides with the window glass can be absorbed and the occupant can also be prevented from being thrown out of the window by the first expansion area of the airbag. In addition, the impact at the time when the occupant secondarily collides with the rear pillar on the rear side of the window can be absorbed and mitigated by the second expansion area of the airbag. Thereby the occupant can be surely protected further. In particular, according to the invention, since the second expansion area is an area where no longitudinal tension is provided by the connecting member and thereby provides an impact absorbing characteristic superior to that of the first expansion area, the impact on the occupant can be surely absorbed.

In another embodiment, since the rear pillar is adapted to dispose on a side of an occupant seated on a rear seat of the vehicle; and the second expansion area of the airbag is adapted to be expanded to overlap with the rear pillar when viewed from a side of the vehicle, the reaction force at the time when the occupant collides with the rear pillar after the impact load is acted on the side of the vehicle body is recieved by the rear pillar and thereby the impact can be surely absorbed.

In other embodiment, since a rear end portion of the first expansion area of the airbag, the second expansion area of the airbag and the connecting member are housed at least in the rear pillar trim and are adapted to be expanded with running out from a front end of the rear pillar trim to an outside of the rear pillar trim in the expanded condition of the airbag, the airbag can be hidden behind the trim in its housed condition with excellent appearance of the compartment of the vehicle.

In further embodiment, since the second expansion area of the airbag is adapted to be expanded earlier than the first expansion area, the occupant can be surely protected further even when the rear pillar is protruded more toward the inside of the compartment of the vehicle comparing with the window and is located closer to the occupant by the rear pillar trim.

What is claimed is:

1. In an occupant protection device of a vehicle, said vehicle including a front side pillar and a rear side pillar disposed on front and rear sides of a side window of said vehicle respectively, and a roof side rail longitudinally extended to connect respective upper ends of said pillars; said occupant protection device comprising;
   an airbag folded and housed in a range from said front side pillar to said rear side pillar through said roof side rail so that said airbag is expanded to cover an inside of said side window when an impact load is acted on a side of said vehicle,
   an upper edge of said airbag fixed to at least said roof side rail;
   a front connecting member for connecting a front lower end of said airbag to a body of said vehicle positioned frontward of said side window;
   a rear connecting member for connecting a rear lower end of said airbag to the body of said vehicle positioned rearward of said side window; and
   a slack absorbing device attached to at least one of said front and rear connecting members for absorbing a slack in said connecting members in an expanded condition of said airbag; said slack absorbing device including an expanding portion which is formed in at least one of the front and rear ends of said airbag and is expanded in the expanded condition of said airbag,
   a hole formed in said airbag positioned in a central direction more than said expanding portion with laterally penetrating said airbag, and
   at least one of said connecting members includes an end which is passed through said hole from either side of said expanding portion to the opposite side of said expanding portion and fixed at said opposite side of said expanding portion and wound around said opposite side of said expanding portion.

2. In an occupant protection device of a vehicle, said vehicle including a front side pillar and a rear side pillar disposed on front and rear sides of a side window of said vehicle respectively, and a roof side rail longitudinally extended to connect respective upper ends of said pillars; and said occupant protection device comprising;
   an airbag which is folded and housed in the range from said front side pillar to said rear side pillar through said roof side rail so that said airbag is expanded to cover an inside of said side window when an impact load is acted on a side of said vehicle,
   an upper edge of said airbag fixed to at least said roof side rail;
   a front connecting member for connecting a front lower end of said airbag to a body of said vehicle positioned frontward said side window; and
   a rear connecting member for connecting a rear lower end of said airbag to the body of said vehicle positioned rearward said side window; and
   a slack absorbing device including
      an expanding portion which is formed in at least one of the front and rear ends of said airbag and is expanded in the expanded condition of said airbag,
      a hole formed in said airbag positioned in the central direction more than said expanding portion with laterally penetrating said airbag, and
      at least one of said connecting members includes an end passed through said hole from either side of said expanding portion to the opposite side of said expanding portion and fixed at said opposite side of said expanding portion and wound around said opposite side of said expanding portion.

3. An occupant protection device of a vehicle in accordance with claim 1, wherein said slack absorbing device is disposed between at least one of said connecting members and a body of said vehicle.

4. In an occupant protection device of a vehicle, said vehicle including a front side pillar and a rear side pillar disposed on front and rear sides of a side window of said vehicle respectively, and a roof side rail longitudinally extended to connect respective upper ends of said pillars; said occupant protection device comprising;
   an airbag folded and housed in a range from said front side pillar to said rear side pillar through said roof side rail so that said airbag is expanded to cover an inside of said side window when an impact load is acted on a side of said vehicle,
   an upper edge of said airbag fixed to at least said roof side rail;
   a front connecting member for connecting a front lower end of said airbag to a body of said vehicle positioned frontward of said side window;
   a rear connecting member for connecting a rear lower end of said airbag to the body of said vehicle positioned rearward of said side window; and
   a slack absorbing device attached to at least one of said front and rear connecting members for absorbing a slack in said connecting members in an expanded condition of said airbag;
   wherein at least one of said connecting members includes a first end connected to said airbag and a second end connected to said body, said first end being disposed upward of said second end in a housed condition of said airbag; and
   said slack absorbing device includes a guide member for guiding said at least one of said connecting members with said at least one of said connecting members, bending when said first end is moved downward in the expanded condition of said airbag, and
   said guide member includes a bank portion for pushing said at least one of said connecting members in the inward direction with respect to a compartment of said vehicle in the expanded condition of said airbag.

5. An occupant protection device of a vehicle in accordance with claim 2, wherein at least one of said connecting members includes an end connected to the airbag, said end being sewn to said airbag at or in the vicinity of a seam of said airbag.

6. An occupant protection device of a vehicle in accordance with claim 1, wherein each of said front and rear connecting members is housed between one of said pillars of said body and an interior member of said pillar in the housed condition of said airbag.

7. An occupant protection device of a vehicle in accordance with claim 1, wherein said vehicle includes: a plurality of seats disposed longitudinally, said plurality of seats having a front seat and a rear seat positioned rearward with respect to said front seat; a front pillar positioned forward of said front seat; and a quarter pillar extending from a vicinity of a lateral side of said rear seat to the rear of said rear seat, wherein;

said front side pillar is said front pillar, said rear pillar is said quarter pillar; and said airbag is expanded to cover a side window disposed between said front pillar and said quarter pillar.

8. An occupant protection device in accordance with claim 1, wherein said vehicle includes: a front pillar and a rear pillar disposed on front and rear sides of a side window of said vehicle respectively, said front and rear pillars extending substantially vertically along said front and rear edges of said side window respectively; and a roof rail extending in the longitudinal direction of said vehicle to connect respective upper ends of said front and rear pillars, said occupant protection apparatus farther comprising:

a first expansion area of said airbag housed along at least said roof rail expanded into a compartment of said vehicle to cover said side window when an impact load is acted to a side of said vehicle; and said rear connecting member connected between a rear end of said airbag and a body of said vehicle is positioned on a rear side of said airbag for providing a longitudinal tension to a lower portion of the airbag during the expansion of said airbag, wherein said airbag includes a second expansion area which is expanded into a compartment of said vehicle positioned rearward of an exit portion through which said first expansion area is expanded into said compartment of said vehicle.

9. An occupant protection device in accordance with claim 2, wherein said vehicle includes: a front pillar and a rear pillar disposed on front and rear sides of a side window of said vehicle respectively, said front and rear pillars extending substantially vertically along said front and rear edges of said side window respectively; and a roof rail extended in the longitudinal direction of said vehicle to connect respective upper ends of said front and rear pillars, said occupant protection apparatus comprising:

a first expansion area of said airbag housed along at least said roof rail expanded into a compartment of said vehicle to cover said side window when an impact load is acted to a side of said vehicle; and said rear connecting member connected between a rear end of said airbag and a body of said vehicle is positioned on a rear side of said airbag for providing a longitudinal tension to a lower portion of the airbag during the expansion of said airbag, wherein said airbag includes a second expansion area which is expanded into a compartment of said vehicle positioned rearward of an exit portion through which said first expansion area is expanded into said compartment of said vehicle.

10. An occupant protection device in accordance with claim 4, wherein said vehicle includes: a front pillar and a rear pillar disposed on a front and rear sides of a side window of said vehicle respectively, said front and rear pillars being extended approximately vertically along said front and rear edges of said side window respectively; and a roof rail extended in the longitudinal direction of said vehicle to connect respective upper ends of said front and rear pillars, said occupant protection apparatus comprising:

a first expansion area of said airbag housed along at least said roof rail expanded into a compartment of said vehicle to cover said side window when an impact load is acted to a side of said vehicle; and said rear connecting member connected between a rear end of said airbag and a body of said vehicle is positioned on a rear side of said airbag for providing a longitudinal tension to a lower portion of the airbag during the expansion of said airbag, wherein said airbag includes a second expansion area which is expanded into a compartment of said vehicle positioned rearward of an exit portion through which said first expansion area is expanded into said compartment of said vehicle.

11. An occupant protection device in accordance with claim 8, wherein said rear pillar is disposed on a side of an occupant seated on a rear seat of said vehicle; and said second expansion area of said airbag is expanded to overlap with said rear pillar when viewed from a side of said vehicle.

12. An occupant protection device in accordance with claim 9, wherein said rear pillar is disposed on a side of an occupant seated on a rear seat of said vehicle; and said second expansion area of said airbag is expanded to overlap with said rear pillar when viewed from a side of said vehicle.

13. An occupant protection device in accordance with either of claim 10, wherein said rear pillar is disposed on a side of an occupant seated on a rear seat of said vehicle; and said second expansion area of said airbag is expanded to overlap with said rear pillar when viewed from a side of said vehicle.

14. An occupant protection device in accordance with either of claim 9, wherein said second expansion area of said airbag is expanded earlier than said first expansion area.

15. An occupant protection device in accordance with either of claim 9, wherein said second expansion area of said airbag is expanded earlier than said first expansion area.

16. An occupant protection device in accordance with either of claim 10, wherein said second expansion area of said airbag is expanded earlier than said first expansion area.

* * * * *